(12) United States Patent
Toishi et al.

(10) Patent No.: US 6,222,023 B1
(45) Date of Patent: *Apr. 24, 2001

(54) BISAZO COMPOUNDS AND PROCESS FOR DYEING OR PRINTING USING THEM

(75) Inventors: Kouji Toishi, Hannan; Katsumi Agata, Kobe; Toshiyuki Araki, Kyotanabe, all of (JP)

(73) Assignee: Sumitomo Chemical, Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/533,800

(22) Filed: Mar. 24, 2000

(30) Foreign Application Priority Data

Apr. 7, 1999 (JP) .................................................. 11-100014
Nov. 19, 1999 (JP) .................................................. 11-329929

(51) Int. Cl.⁷ ......................... C09B 62/513; C09B 62/09; D06P 1/38
(52) U.S. Cl. ......................... 534/634; 534/612; 534/635; 534/637
(58) Field of Search ..................................... 534/634, 637

(56) References Cited

U.S. PATENT DOCUMENTS

| | | | |
|---|---|---|---|
| 4,622,390 | 11/1986 | Meininger et al. | 534/634 |
| 4,701,523 | 10/1987 | Segal et al. | 534/634 |
| 4,730,038 | 3/1988 | Meininger et al. | 534/637 |
| 4,754,023 | 6/1988 | Tzikas et al. | 534/618 |
| 4,782,140 | 11/1988 | Tzikas | 534/637 |
| 4,786,721 | 11/1988 | Tzikas et al. | 534/617 |
| 4,912,244 | 3/1990 | Tzikas | 558/23 |
| 5,349,057 | 9/1994 | Buch et al. | 534/637 |

FOREIGN PATENT DOCUMENTS

| | | |
|---|---|---|
| 61-247760 | 11/1986 | (JP) . |
| 62-190259 | 8/1987 | (JP) . |
| 62-215661 | 9/1987 | (JP) . |

*Primary Examiner*—Fiona T. Powers
(74) *Attorney, Agent, or Firm*—Stevens, Davis, Miller & Mosher, L.L.P.

(57) ABSTRACT

A bisazo compound represented by the following general formula (1):

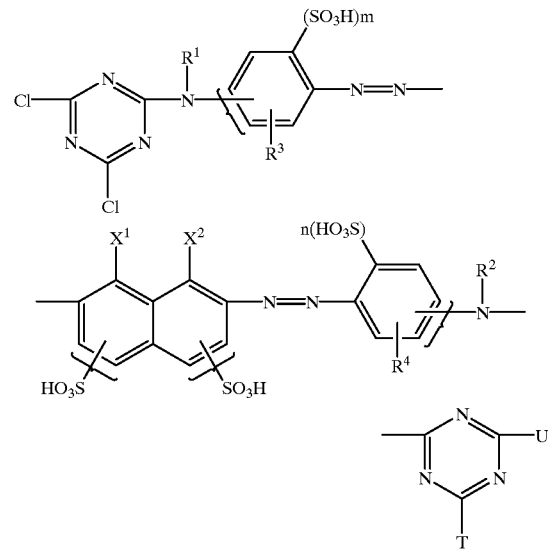

(1)

wherein the variables are as defined in the specification, or a salt thereof is superior in various performance for dyeing and printing a fiber material.

10 Claims, No Drawings

BISAZO COMPOUNDS AND PROCESS FOR DYEING OR PRINTING USING THEM

BACKGROUND OF THE INVENTION

The present Invention relates to dark-blue bisazo compounds usable in dyeing or printing on fiber materials, particularly cellulose fiber materials.

As reactive dyes of dark-blue color usable in dyeing or printing on fiber materials, dyes disclosed in JP-A-57-78458, JP-A-57-198757 and the like have been known.

The present inventors have conducted extensive researches for developing reactive dyes capable of giving dyed products of dark-blue color which are superior in dyeing power, dyeing reproducibility and dyeing performances such as leveling property, build-up property, effective dyeing rate and washing-off property compared with the known dark-blue dyes described above, and which are excellent in various fastness such as chlorine fastness, light fastness, perspiration fastness, perapiration-sunlight fastness, acid-hydrolysis fastness, alkali fastness, washing fastness and peroxide washing fastness. As the result, they have found that the aim can be attained with specific diazo compounds or salts thereof having two triazine rings on the terminal of their molecular structure, one triazine ring being substituted with two chloro and the other triazine ring being substituted with at least one vinylsulfone fiber-reactive group. The present invention thus have been completed.

SUMMARY OF THE INVENTION

The present invention provide a bisazo compound represented by the following general formula (1):

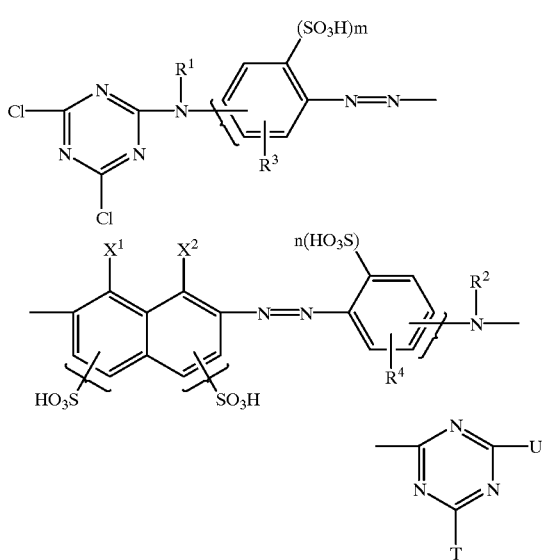

(1)

wherein one of $X^1$ and $X^2$ is hydroxyl and the other is amino, $R^1$ and $R^2$ which are the same to or different from each other, represent hydrogen or alkyl which may be optionally substituted, $R^3$ and $R^4$, which are the same to or different from each other, represent hydrogen, sulfo, methyl, methoxy or chloro, m and n, which are the same to or different from each other, represent 0 or 1, U represents a group selected from the groups represented by the following formulae (2a), (2b) or (2c):

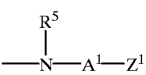

(2a)

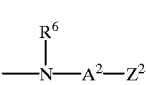

(2b)

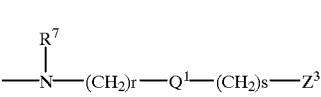

(2c)

wherein $R^5$ represents hydrogen or alkyl which may be optionally substituted, $R^6$ and $R^7$ represent hydrogen, alkyl which may be optionally substituted or phenyl which may be optionally substituted, $A^1$ represents phenylene which may be optionally substituted or naphthylene which may be optionally substituted, $A^2$ represents alxylene which may be optionally substituted, $Q^1$ represents —O—, —S— or —NR$^8$— wherein $R^8$ represents hydrogen, alkyl which may be optionally substituted or phenyl which may be optionally substituted, r and s, which are the same to or different from each other, represent 2, 3 or 4, $Z^1$, $Z^2$ and $Z^3$ represent a fiber-reactive group selected from the groups represented by the following formulae (3a) or (3b):

(3a)

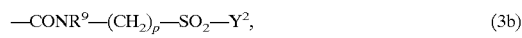

(3b)

wherein $Y^1$ and $Y^2$ which are the same to or different from each other, represent —CH=CH$_2$ or —CH$_2$CH$_2$L wherein L is a group which can be eliminated by the action of an alkali, $R^9$ represents hydrogen or alkyl which may be optionally substituted, and p is an integer of 1 to 6, T represents a group selected from the groups represented by the formulae (2a), (2b) or (2c), fluoro, chloro, pyridinio which may be optionally substituted or a group selected from the groups represented by the following formulae (4a), (4b) or (4c):

(4a)

(4b)

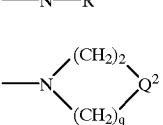

(4c)

wherein $R^{10}$ and $R^{11}$, which are the same to or different from each other, represent hydrogen, alkyl which may be optionally substituted, cycloalkyl which may be optionally substituted or phenyl which may be optionally substituted, $R^{12}$ represent hydrogen, alkyl which may be optionally substituted, cycloalkyl which may be optionally substituted or phenyl which may be optionally substituted, $Q^2$ represents —CH$_2$—, —O—, —S—, —SO$_2$— or —NR$^{12}$— wherein $R^{13}$ represents hydrogen or alkyl which may be optionally substituted, and q is 1, 2 or 3, or a salt thereof.

DETAILED DESCRIPTION OF THE INVENTION

The bisazo compound of the present invention is a compound represented by the general formula (1), shown above, wherein one of $X^1$ and $X^2$ represents hydroxyl and the other represents amino, and m and n, which are the same to or different from each other, represent 0 or 1. Preferably, at least one of m and n is 1.

$R^1$ and $R^2$, which are the same to or different from each other, represent hydrogen or alkyl which may be optionally substituted. Said alkyl has preferably 1 to 4 carbon atoms. Examples of substituents on said alkyl include hydroxyl, cyano, alkoxy having 1 to 4 carbon atoms, halogeno, carbamoyl, carboxy, alkoxycarbonyl wherein the alkoxy has 1 to 4 carbon atoms, alkylcarbonyloxy wherein the alkyl has 1 to 4 carbon atoms, sulfo and sulfamoyl.

The above alkyl, alkoxy as a substituent on said alkyl, alkoxycarbonyl wherein alkoxy has 1 to 4 carbon atoms and alkylcarbonyloxy wherein alkyl has 1 to 4 carbon atoms may be straight chain or branched chain.

Specific examples of alkyl which may be optionally substituted, represented by $R^1$ and $R^2$, include methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl.

$R^1$ and $R^2$ in the formula (I) are preferably hydrogen, methyl or ethyl, with hydrogen being particularly preferred.

$R^3$ and $R^4$ in the formula (I), which are the same to or different from each other, represent hydrogen, sulfo, methyl, methoxy or chloro, with hydrogen, sulfo, methyl and methoxy being preferred and hydrogen and sulfo being particularly preferred.

U in the formula (1) represents a group selected from the groups represented by the formulae (2a), (2b) or (2c), described above. $R^5$ in the formula (2a) represents hydrogen or alkyl which may be optionally substituted. Examples of said alkyl represented by $R^5$ has preferably 1 to 4 carbon atoms. Examples of substituents on said alkyl represented by $R^5$ include hydroxyl, cyano, alkoxy having 1 to 4 carbon atoms, halogeno, carbamoyl, carboxy, alkoxycarbonyl wherein the alkoxy has 1 to 4 carbon atoms, alkylcarbonyloxy wherein the alkyl has 1 to 4 carbon atoms, sulfo and sulfamoyl.

$R^6$ in the formula (2b) and $R^7$ in the formula (2c) either have the same meaning as $R^5$ or they represent phenyl which may be optionally substituted.

$R^5$ is preferably hydrogen, methyl or ethyl,, and $R^6$ and $R^7$ are preferably hydrogen, methyl or ethyl.

In the formula (2a) described above, $A^1$ represents phenylene which may be optionally substituted or naphthylene which may be optionally substituted. Examples of the phenylene represented by $A^1$ include phenylene groups which may be optionally substituted with one or two substituents selected from alkyl having 1 to 4 carbon atoms, alkoxy having 1 to 4 carbon atoms, sulfo and halogeno, and the like.

Preferred examples of the phenylene represented by $A^1$ include phenylene which may be optionally substituted with one or two substituents selected from methyl, ethyl, methoxy, ethoxy, chloro, bromo and sulfo.

Specific examples of the phenylene represented by $A^1$ include:

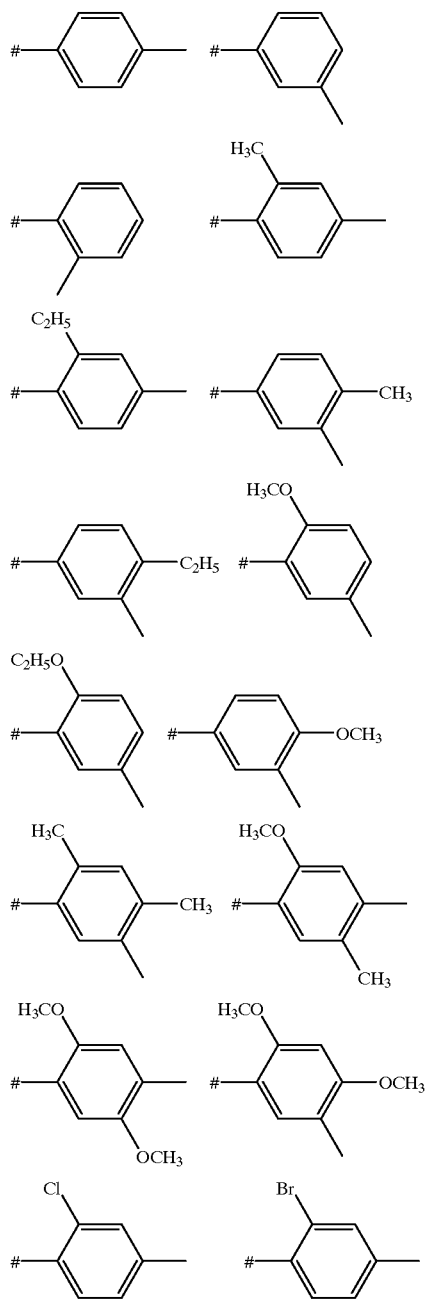

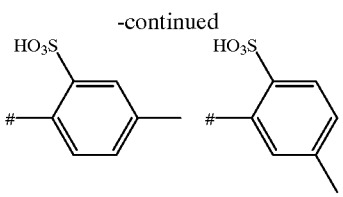

wherein bonds marked with a symbol # mean bonds connected to the group of —NR$^5$—.

Particularly preferred examples of the phenylene include unsubstituted phenylene and phenylene substituted with one or two groups selected from methyl and methoxy.

Examples of the naphthylene represented by A$^1$ in the formula (2a) include naphthylene which may be optionally substituted with one or two substituents selected from alkyl having 1 to 4 carbon atoms, alkoxy having 1 to 4 carbon atoms, sulfo, halogeno, and the like.

Preferred examples of the naphthylene represented by A$^1$ include naphthylene which may be optionally substituted with one or two sulfo.

Specific examples of the phenylene represented by A$^1$ include:

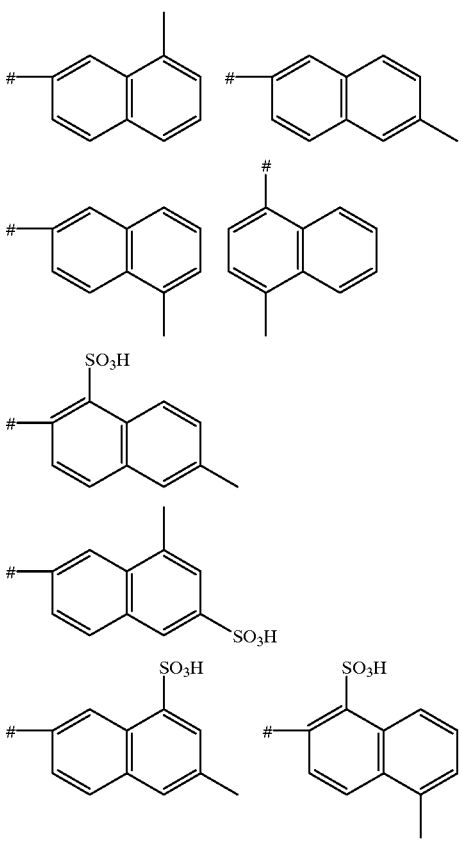

wherein bonds marked with a symbol # mean bonds connected to the group of —NR$^5$—.

Preferably, A$^1$ in the formula (2a) is phenylene which may be optionally substituted with one or two groups selected from methyl and methoxy.

In the formula (2b) described above, A$^2$ represents alkylene which may be optionally substituted. Examples of the alkylene represented by A$^2$ include alkylene having 2 to 4 carbon atoms which may be optionally substituted with a substituent selected from alkyl having 1 to 4 carbon atoms, halogeno, hydroxyl, sulfo, cyano, alkoxy having 1 to 4 carbon atoms, alkoxycarbonyl wherein the alkoxy has 1 to 4 carbon atoms, alkylcarbonyloxy wherein the alkyl has 1 to 4 carbon atoms and carbamoyl.

Preferred examples of the alkylene represented by A$^2$ include unsubstituted alkylene having 2 to 4 carbon atoms and particularly preferred examples thereof include ethylene and trimethylene.

In the formula (2c) described above, Q$^1$ represents —O—, —S— or —NR$^8$— wherein R$^6$ represents hydrogen, alkyl which may be optionally substituted or phenyl which may be optionally substituted.

Examples of the alkyl represented by R$^8$ include same alkyl having 1 to 4 carbon atoms to those listed above as examples of R$^1$ and R$^2$.

Examples of the phenyl represented by R$^8$ include phenyl which may be optionally substituted with sulfo.

Preferred R$^8$ is hydrogen, methyl or ethyl.

In the formula (2c), r and s, which are the same to or different from each other, represent 2, 3 or 4.

Preferably, in the groups represented by —(CH$_2$)$_r$—Q$^1$—(CH$_2$)$_s$ in the formula (2c), Q$^1$ is —O— and r and s, which are the same to or different from each other, are 2 or 3.

Specifically, preferred examples of the group include:

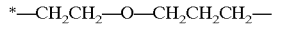

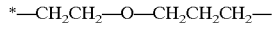

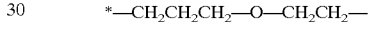

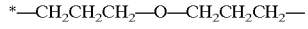

wherein bonds marked with a symbol * mean bonds connected to the group of —NR$^7$—. Amongst them, the group of the formula:

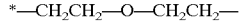

wherein the symbol * has the same meaning as above is particularly preferred.

Among the groups represented by U, the groups represented by the above formulae (2a) and (2b) are preferred, with the group of the formula (2a) being particularly preferred.

When U is the group represented by the formula (2a), the group wherein A$^1$ is phenylene which may be optionally substituted and R$^5$ is hydrogen, methyl or ethyl is preferred.

When U is the group represented by the formula (2b), the group wherein A$^2$ is ethylene or trimethylene and R$^5$ is hydrogen, methyl or ethyl is preferred.

In the formulae (2a), (2b) and (2c), Z$^1$, Z$^2$ and Z$^3$ each represent a fiber-reactive group represented by the formula (3a) or (3b) wherein Y$^1$ and Y$^2$, which are the same to or different from each other, represent —SO$_2$CH=CH$_2$ or —SO$_2$CH$_2$CH$_2$L wherein L is a group which can be eliminated by the action of an alkali.

Examples of the group represented by L, i.e. a group which can be eliminated by the action of an alkali, Include sulfate ester, thiosulfate ester, phosphate aster, acetate ester and halogeno. Amongst them, sulfate ester group and chloro are preferred. Z$^1$, Z$^2$ and Z$^3$ are preferably —CH=CH$_2$, —CH$_2$CH$_2$Cl or —CH$_2$CH$_2$OSO$_3$H. Amongst them, —CH$_2$=CH$_2$ and —CH$_2$CH$_2$SO$_3$H are particularly preferred.

In the above formula (3b), R$^9$ represents hydrogen or alkyl which may be optionally substituted. Examples of alkyl represented by R$^9$ Include alkyl having 1 to 4 carbon atoms which are same to the alkyl listed above as the examples for $R^1$ and $R^2$.

In the above formula (3b), p is an integer of 1 to 6. As the group represented by the formula (3b), a group wherein $R^9$ is hydrogen and p is 2 or 3 is particularly preferred.

As groups represented by $Z^1$, $Z^2$ and $Z^3$, the group represented by the formula (3a) is particularly preferred, T in the above formula (1) represents a group selected from the groups represented by the formulae (2a), (2b) or (2c), fluoro, chloro, pyridinio which may be optionally substituted or a group selected from the groups represented by the formulae (4a), (4b) or (4c).

Examples of pyridinio group represented by T include pyridinio, 2-, 3- or 4-carboxypyridinio, 2-, 3- or 4-carbamoylpyridinio, 3-sulfopyridinio, 4-(2-sulfoethyl) pyridinio, 3-(2-hydroxyethyl)pyridinio, 4-chloropyridinio, 3-methylpyridinio and 3,5-dicarboxypyridinio. Among them, 3- or 4-carboxypyridinio is preferred.

$R^{10}$ and $R^{11}$ in the above formula (4a), which are the same to or different from each other, represent hydrogen, alkyl which may be optionally substituted, cycloalkyl which may be optionally substituted or phenyl which may be optionally substituted. The above alkyl may be straight chain or branched chain and preferably has 1 to 4 carbon atoms.

Examples of the alkyl and represented by $R^{10}$ or $R^{11}$ include alkyl having 1 to 4 carbon atoms and cycloalkyl having 1 to 4 carbon atoms both of which may be optionally substituted with one or two groups selected from alkoxy having 1 to 4 carbon atoms, sulfo, carboxy, sulfamoyl, carbamoyl, hydroxyl, halogeno such as chloro or bromo, cyano, carboxylic ester, sulfonic ester, phenyl which may be optionally substituted and sulfato.

Examples of phenyl mentioned above as a substituent on the above alkyl include phenyl which may be optionally substituted with one or two groups selected from alkyl having 1 to 4 carbon atoms, alkoxy having 1 to 4 carbon atoms, sulfo and halogeno such as chloro or bromo.

Specific examples of alkyl represented by $R^{10}$ and $R^{11}$ include the alkyl groups same to those exemplified for $R^1$ and $R^2$ and benzyl which may be optionally substituted.

Among them, methyl, ethyl, n-propyl, isprolyl, n-butyl, isobutyl, sec-butyl, 2-hydroxyethyl, 2-sulfoethyl, 2-methoxyethyl, 2-carboxyethyl, 2-carbamoylethyl, 2-sulfamoylethyl, benzyl, 2-, 3- or 4-sulfobenzyl and the like are preferred as the alkyl represented by $R^{10}$ and $R^{11}$.

Examples of phenyl represented by $R^{10}$ and $R^{11}$ include phenyl which may be optionally substituted with one or two groups selected from alkyl having 1 to 4 carbon atoms, alkoxy having 1 to 4 carbon atoms, sulfo, carboxy, halogeno, hydroxyl, cyano, carbamoyl, sulfamoyl, carboxylic ester, 2-hydroxyethylsulfonyl, amino, acylamino, alkylamino wherein the alkyl has 1 to 4 carbon atoms, and the like.

Preferred examples of the phenyl represented by $R^{10}$ and $R^{11}$ include phenyl, 2-, 3- or 4-methylphenyl, 2-, 3- or 4-methoxyphenyl, 2-, 3- or 4-ethylphenyl, 2-, 3- or 4-ethoxyphenyl, 2-, 3- or 4-isopropylphenyl, 2-, 3- or 4-carboxyphenyl, 2-, 3- or 4-carbamoylphenyl, 2-, 3- or 4-chlorophenyl, 2-, 3- or 4-sulfophenyl, 2-, 3- or 4-hydroxyphenyl, 2-sulfo-4-methoxyphenyl, 2-sulfo-4-acetylaminophenyl, 2-carboxy-4-acetylaminophenyl, 2-methoxy-5-methylphenyl, 2,4-dimethoxyphenyl and 2,5-dimethoxyphenyl.

Preferably, one of $R^{10}$ and $R^{11}$ is hydrogen or alkyl which may be optionally substituted and the other is phenyl which may be optionally substituted.

Particularly preferred $R^{10}$ and $R^{11}$ include a combination in which $R^{10}$ is hydrogen, methyl or ethyl and $R^{11}$ is phenyl which may be optionally substituted with a group selected from alkyl having 1 to 4 carbon atoms, alkoxy having 1 to 4 carbon atoms, sulfo, carboxy, halogeno, hydroxyl, cyano and acylamino.

$R^{12}$ in the formula (4c) represent hydrogen,, alkyl which may be optionally substituted, cycloalkyl which may be optionally substituted or phenyl which may be optionally substituted.

When T in the general formula (1) is a group represented by the formula (4a), examples of the amine compound represented by $HNR^{10}R^{11}$ used for forming this group include:

ammonia;

aromatic amines such as 1-aminobenzene, 1-amino-2-, -3- or -4-methylbenzene, 1-amino-2,4-, -3,4- or -3,5-dimethylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-proplbenzene, 1-amino-2-, -3- or -4-isopropylbenzene, 1-amino-2-, -3- or -4-chlorobenzene, 1-amino-2-, -3- or -4-bromobenzene, 1-amino-2-, -3- or -4-fluorobenzene, 1-amino-2,4- or -2,5-dimethoxybenzene, 1-amino-2-methoxy-5-methylbenzene, 3- or 4-aminophenylmethanesulfonic acid, 2-, 3- or 4-aminobenzenesulfonic acid, 3- or 4-methylaminobenzenesulfonic acid, 3- or 4-ethylaminobenzenesulfonic acid, 5-aminobenzene-1,3-disulfonic acid, 6-aminobenzene-1,3- or -1,4-disulfonic acid, 4-aminobenzene-1,2-disulfonic acid, 4-amino-5-methylbenzene-1,2-disulfonic acid, 1-amino-2-sulfo-4-methoxybenzene, 1-amino-2-sulfo-4-acetylaminobenzene, 2-, 3- or 4-aminobenzoic acid, 2-, 3- or 4-carbamoylaniline, 1-amino-2-carboxy-4-acetylaminobenzene, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 1-methylamino-3- or -4-methylbenzene, 1-ethylamino-3- or -4-methylbenzene, 1-methylamino-2-, -3- or -4-chlorobenzene, 1-ethylamino-2-, -3- or -4-chlorobenzene, 1-(2-hydroxyethyl)amino-3-methylbenzene, 3- or 4-methylaminobenzoic acid, 1-amino-2-methoxy-5-methylbenzene, 1-amino-2,5-dimethoxybenzene, 2-, 3- or 4-aminophenol, 1-amino-3- or -4-acetylaminobenzene, 2,4- or 2,5-diaminobenzenesulfonic acid, and 1-aminobenzene-3- or -4-(β-hydroxyethylsulfone);

aliphatic amines such as methylamine, ethylamine, n-propylamine, isopropylamine, n-butylamine, isobutylamine, sec-butylamine, dimethylamine, diethylamine, methylethylamine, allylamine, 2-cloroethylamine, 2-methoxyethylamine, 2-aminoethanol, 2-methylaminoethanol, bis(2-hydoxyethyl)amine, 2-aceytlaminoethylamine, 1-amino-2-propanol, 3-methoxypropylamine, 1-amino-3-dimethylaminopropane, 2-aminoethanesulfonamide, 2-aminoethanesulfonic acid, aminomethanesulfonic acid, 2-methylaminoethanesulfonamide, 2-methylaminoethanesulfonic acid, 3-amino-1-propanesulfonic acid, 2-sulfate ethylamine, aminoacetic acid, methylaminoacetic acid, 3-aminopropionic acid, 3-aminopropionamide, 3-methylaminopropionamide, ε-aminocaproic acid, benzylamine, 2-, 3- or 4-sulfobenzylamine, 2-, 3- or 4-chlorobenzylamine, 2-, 3- or 4-methylbenzylamine, N-methybenzylamine, 1-phenylethylamine, 2-phenylethylamine, and 1-phenyl-2-propylamine.

Preferred examples of the above amine compound include aniline, N-methylaniline, N-ethylaniline, 2-, 3- or 4-chloroaniline, N-methyl-2-, -3- or -4-chloroaniline, N-ethyl-2-, -3- or -4-chloroaniline, 2-, 3- or 4-methylaniline, 2-, 3- or 4-ethylaniline, 2-, 3- or 4-methoxyaniline, 2-, 3- or 4-ethoxyaniline, 2-, 3- or 4-propylaniline, 2-, 3- or 4-isopropylaniline, 2-, 3- or 4-hydroxyaniline, aniline-2-,-3- or -4-sulfonic acid, 3- or 4-methylaminobenzenesulfonic acid, 3- or 4- ethylaminobenzenesulfonic acid, 2-3- or 4-carboxyaniline, 2-, 3- or 4-carbamoylaniline, 2,4- or 2,5-dimethoxyaniline, 2-sulfo-4-methoxyaniline, 2-sulfo-4-acetylaminoaniline, 2-carboxy-4-acetylaminoaniline, 2-methoxy-5-methylaniline, ammonia, methylamine, ethylamine, dimethylamnine, taurine, N-methyltaurine, mono- or diethanolamine, 2-sulfamoylethylamine, and 2-carbamoylethylamine.

Among them, aniline, N-methylaniline, N-ethylaniline, N-ethyl-2-, -3- or -4-chloroaniline, 2-, 3- or 4-ethylaniline, 2-, 3- or 4-methoxyaniline, 2-, 3- or 4-propylaniline, 2-, -3- or 4-isopropylaniline, 2-, 3- or 4-hydroxyaniline, aniline-2-, -3- or -4-sulfonic acid, 2-, 3- or 4-carboxyaniline, 2-, 3- or 4-carbamoylaniline, 2,4- or 2,5-dimethoxyaniline, 2-sulfo-4-methoxyaniline, 2-sulfo-4-acetylaminoaniline, 2-carboxy-4-acetylaminoaniline, 2-methoxy-5-methyaniline are particularly preferred.

$R^{12}$ is more preferably hydrogen or alkyl having 1 to 4 carbon atoms, and among them, methyl or ethyl is particularly preferable.

When T in the general formula (1) is a group represented by the formula (4c), examples of the compound represented by $HOR^{12}$ used for forming this group include:

phenols such as phenol, 1-hydroxy-2-, -3- or -4-methylbenzene, 1-hydroxy-3,4- or -3,5-diemthylbenzene, 1-hydroxy-2-, -3- or -4-ethylbenzene, 1-hydroxy-2-, -3- or -4-methoxybenzene, 1-hydroxy-2-, -3- or -4-ethoxybenzene, 1-hydroxy-2-, -3- or -4-chlorobenzene, 3- or 4-hydroxyphenylmethanesulfonic acid, 3- or 4-hydroxybenzenesulfonic acid, 5-hydroxybenzene-1,3-disulfonic acid, 2-hydroxybenzene-1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene-1,3-dicarboxylic acid, and 5-hydroxy-2-ethoxybenzenesulfonic acid;

aliphatic alcohols such as methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethaneuslfonic acid, 3-hydroxyethoxypropanol, 3-hydroxy-1-propanesulfonic acid, 2-cyanoethanol, 2-sulfateethanol, glycolic acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenylethanol and 1-phenyl-2-propanol.

In the general formula (4b), $Q^2$ represents —$CH_2$—, —O—, —S—, —$SO_2$— or —$NR^{13}$—, wherein $R^{13}$ represents hydrogen or alkyl which may be optionally substituted, and p is 1, 2 or 3. The alkyl represented by $R^{13}$ preferably has 1 to 4 carbon atoms. Examples of the substituent of this alkyl include halogeno such as chloro and bromo and alkoxy having 1 to 4 carbon atoms. Examples of $R^{13}$ include hydrogen and straight or branched $C_1$ to $C_4$ unsubstituted alkyl, with hydrogen, methyl and ethyl being particularly preferred.

Specific examples of the group represented by formula (4b) include residual groups derived from pyrrolidine, piperidine, piperazine, n-alkylpiperazine and morpholine. Among them, groups in which q is 2 and $Q^2$ is —O— or —$CH_2$—, namely, morpholino or piperidino is particularly preferable.

As the group represented by T in the formula (1), fluoro, chloro, pyridinio which may be optionally substituted and a group represented by the formula (4a) are preferred, with fluoro and chloro being particularly preferred.

The bisazo compound of the present invention may be in the form of a free acid, a salt thereof or a mixture thereof. Preferably, the bisazo compound is In the form of an alkaline metal salt, an alkaline earth metal salt or a mixture containing them. Among them, a sodium salt, potassium salt, lithium salt and a mixture containing them are particularly preferred.

The bisazo compound of the present invention is not limited as long an it is represented by the formula (1) ot a salt thereof. Preferred examples of the bisazo compound of the present invention include compounds, the free acid form of which is represented by the following formula (1a):

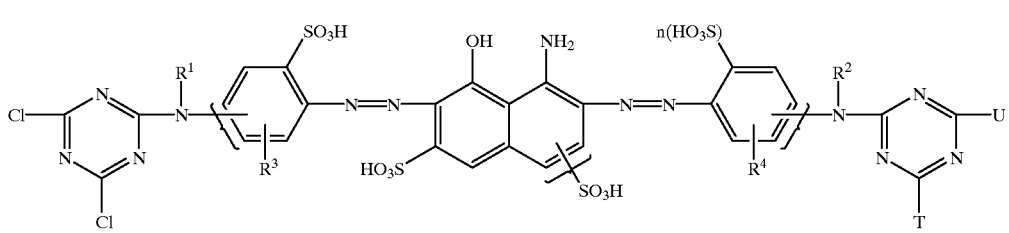

(1a)

wherein $R^1$, $R^2$, $R^3$, $R^4$, U, T and n have the same meaning as above.

Among the compounds represented by the formula (1a), preferred are those wherein $R^1$ and $R^2$, which are the same to or different from each other, represent hydrogen, methyl or ethyl; $R^3$ and $R^4$, which are the same to or different from each other, represent hydrogen, sulfo, methyl or methoxy; U represent a group of the formula (2a) described above, wherein $A^1$ is phenylene, $R^5$ is hydrogen, methyl or ethyl and $Z^1$ is —$SO_2CH=CH_2$ or —$SO_2CH_2CH_2OSO_3H$; and T is fluoro or chloro.

The process for producing the bisazo compound of the formula (1) is not particularly limited. It can be produced, for example, in the following manner.

For producing the bisazo compound of the formula (1) wherein T is fluoro or chloro, first of all, a compound represented by the following formula (6):

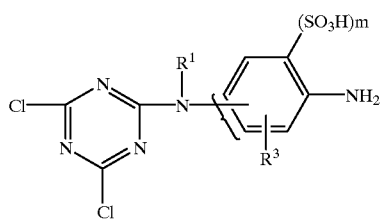

(6)

wherein $R^1$, $R^3$ and m have the same meaning as above, or a salt thereof, is obtained by condensing a diamine compound, the free acid form of which is represented by the following formula (5):

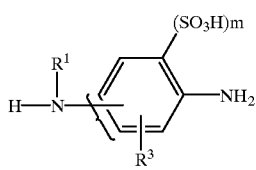

(5)

wherein $R^1$, $R^3$ and m have the same meaning as above, with 2,4,6-trihalogeno-s-triazine.

A compound represented by the following formula (9);

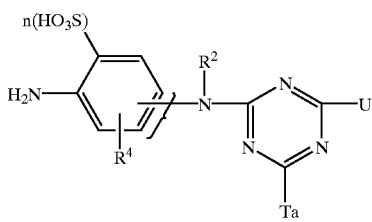

(9)

wherein $R^2$, $R^4$, U and n have the same meaning as above, and Ta represents chloro or fluoro, or a salt thereof, is also obtained by condensing a compound represented by the following formula (7):

 (7)

wherein U has the same meaning as above, and a diamine compound the free acid form of which is represented by the following formula (8):

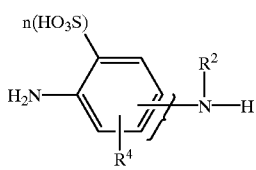

(8)

wherein $R^2$, $R^4$ and n have the same meaning as above, with 2,4,6-trihalogeno-s-triazine.

The bisazo compound represented by the formula (1) or a salt thereof can be obtained by diazotizing the compound represented by the general formula (6) and the compound represented by the general formula (9) according to the conventional method to obtain a diazo compound and, then, coupling, in any desired order, the obtained diazo compound with 1-amino-8-naphthol compound, the free acid form of which is represented by the formula (10):

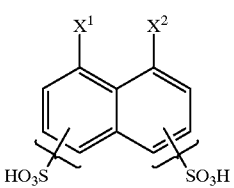

(10)

wherein $X^1$ and $X^2$ have the same meaning as above.

The first reaction of the coupling reaction here can be conducted at a temperature of −10° C. to +30° C. while controlling pH between 0 and 4, and the second reaction of the coupling reaction here can be conducted at a temperature of 0° C. to +40° C. while controlling pH between 2 and 8.

Alternatively, the bisazo compound of the formula (1) can be produced, for example, in the following manner.

That is, a compound of the following formula (12):

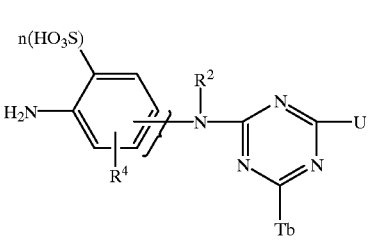

(12)

wherein $R^2$, $R^4$, U and n have the same meaning as above, and Tb represents a group of the formula (2a), (2b), (2c), (4a), (4b) or (4c) or pyridinio which may be optionally substituted, or a salt thereof, is obtained by condensing a compound represented by the above formula (7), a diamine compound represented by the above formula (8), or a salt thereof, and a compound represented by the formula (11):

 (11)

wherein Tb represents a group of the formula (2a), (2b), (2c), (4a), (4b) or (4c) or pyridinio which may be optionally substituted, with the proviso that when Tb is pyridinio which may be optionally substituted, then the above formula (11) is represented by Tb, with 2,4,6-trihalogeno-s-triazine.

The bisazo compound represented by the general formula (1) or a salt thereof can be obtained by using the above compounds of the formulas (6) and (12) as the diazo components and coupling them with 1-amino-8-naphthol compound of the above formula (10) in any desired order.

In addition, according to an alternative process, the bisazo compound of the formula (1) can be produced in the following manner.

Firstly, a compound of the above formula (9) is obtained by condensing the compound of the above formula (7) and the compound of the above formula (8) with 2,4,6-trihalogeno-s-triazine.

Then, a monoazo compound of the following formula (13)

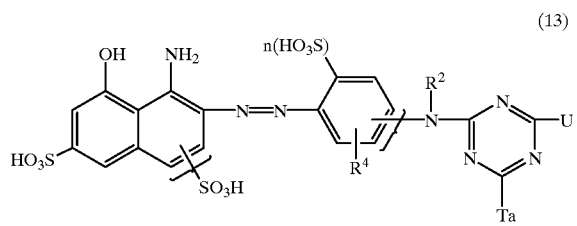

wherein $R^2$, $R^4$, U and n have the same meaning as above, and Ta represents chloro or fluoro, or a salt thereof, is obtained by using the obtained compound of the formula (9) as the diazo component and coupling it with a 1-amino-8-naphthol compound of the above formula (10).

The monoazo compound of the above formula (13) or a salt thereof can be obtained by conducting the coupling reaction here at a temperature of −10° C. to +30° C. and pH between 0 and 4.

A compound represented by the following formula (14):

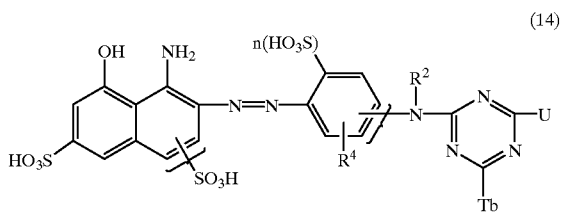

wherein $R^2$, $R^4$, U and n have the same meaning as above, and Tb represents the formula (2a), (2b), (2c), (4a), (4b), (4c) or pyridinio which may be optionally substituted, or a salt thereof, can be obtained by condensing a monoazo compound of the above formula (13) with a compound of the formula (11).

The same compound can be obtained even when the order of the condensing reaction of the compounds of the formula (7) with 2,4,6-trihalogeno-s-triazine ring and the condensing reaction of the compounds of the formula (11) with 2,4,6-trihalogeno-s-triazine ring is changed in the above manner.

A compound of the following formula (15):

The coupling reaction here can be conducted at a temperature of 0° C. to +40° C. while controlling pH between 2 and 8.

In the above manners for producing the bisazo compound of the formula (1), three kinds of compounds are condensed with 2,4,6-trihalogeno-s-triazine ring. The order for the condensation reactions with 2,4,6-trihalogeno-s-triazine is not particularly limited. In addition, the conditions for such condensation reactions are not particularly limited. Usually, the first condensation reaction, i.e. the reaction with unsubstituted triazine, is conducted at a temperature of −10° C. to 40° C. and a pH of 1 to 10 for; the second condensation reaction, i.e. the reaction with monosubstituted triazine, is conducted at a temperature of 0° C. to 70° C. and a pH of 2 to 10; and the third condensation reaction, i.e. the reaction with disubstituted triazine, is conducted at a temperature of 10° C. to 100° C. and a pH of 2 to 9.

For obtaining the bisazo compound of the formula (1) wherein groups represented by $Y^1$ and $Y^2$ in the above formulae (3a) and (3b) are —$CH_2CH_2L$, and L, a group which can be eliminated by the action of an alkalis is an ester, such as a sulfate ester or a phosphate ester, said ester group can be formed after the condensation reaction is completed.

The raw material, 2,4,6-trihalogeno-s-triazine, is preferably cyanuryl chloride or cyanuryl fluoride.

The 1-amino-8-naphthol compound represented by the above formula (10) is preferably H acid or K acid, with H acid being particularly preferred.

The above explained bisazo compounds of the formula (1) or a salt thereof can be used, for example, as reactive dyes for dyeing or printing onto a fiber material. The fiber material is not particularly limited as far as it has a hydroxyl and/or a carbonamido group. Examples thereof include natural or regenerated cellulose fibers, natural or synthesized polyamide fibers, polyurethane fibers, leathers and mixed materials containing them.

The natural cellulose fibers specifically include cotton, linen, flax, jute, ramie and the like. Preferred one is cotton.

The regenerated cellulose fibers specifically Include rayon, polynosic, cupra and products commercialized under the names "Tencel", "Tufcel", "Modal", "Celtima" and the like.

The natural or synthetic polyamide fibers specifically include wool, other animal hair, silk, polyamide-6,6, polyamide-6, polyamide-11, polyamide-4 and the like.

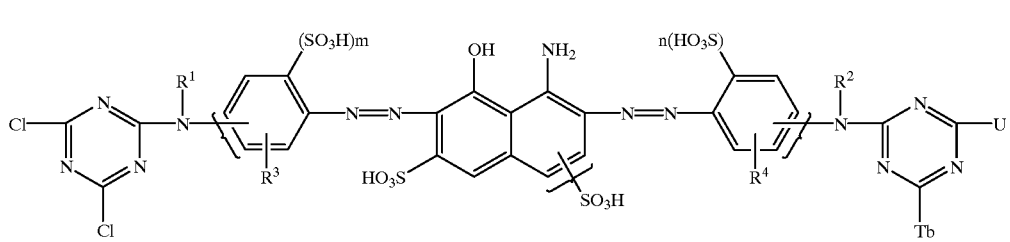

wherein $R^1$, $R^2$, $R^3$, $R^4$, U, m and n have the same meaning as above, and Tb represents the formula (2a), (2b), (2c), (4a), (4b), (4c) or pyridinio which may be optionally substituted, a kind of the compound represented by the general formula (1), or salts thereof is obtained by using a compound of the formula (6) as the diazo component and conducting the diazotization with a compound of the above formula (14).

The mixed materials containing them include textile blend of these fiber materials and textile blend of the fiber material with a synthetic fiber such as polyester, acryl fiber and the like.

The bisazo compound or a salt thereof of the present invention can be used for dyeing or printing onto the above described materials, particularly the above described fiber materials, by a method depending on their physical or chemical properties.

Such method specifically include a method for dyeing or printing onto the above described fibers by the exhaustion dyeing method, the cold batch-up method, the continuous dyeing method, the printing method or the like.

For example, when a cellulose fiber is dyed by the exhaustion dyeing method, the method include dyeing at a temperature of about 30 to 100° C. in the presence of an acid-binding agent such as sodium carbonate, sodium bicarbonate, trisodium phosphate, sodium hydroxide or the like and, if necessary, adding a neutral salt such as sodium sulfate, sodium chloride or the like and, if further required, using a solubilizing agent, penetration agent, leveling agent or the like. The addition of the acid-binding agent, neutral salt and the like can be carried out in one portion or in divided portions according to the routine method.

When a cellulose fiber is dyed by the cold batch-up method, the method include padding using a neutral salt such as sodium sulfate, sodium chloride or the like and an acid-binding agent such as sodium hydroxide, sodium silicate or the like and then standing in a sealed packing material at a determined temperature.

When a cellulose fiber is dyed by the continuous dyeing method, examples of the method include the one-phase padding method in which the fiber is padded according to a known process at room temperature or an elevated temperature in the presence of an acid-binding agent such as sodium carbonate, sodium bicarbonate or the like and then treated by steaming or dry-heating. Also included is the two-phase padding method in which the fiber is dipped in a padding solution containing a compound of the present invention dissolved therein, padded with a neutral salt such as sodium sulfate, sodium chloride or the like and an acid-binding agent such as sodium hydroxide, sodium silicate or the like and then treated by steaming or dry-heating.

When a cellulose fiber is printed, examples of the method include a method in which the fiber is printed, in the one-phase process, with a printing paste containing an acid-binding agent such as sodium bicarbonate or the like and then steamed at a high temperature over 80° C. Also included a method in which the fiber is printed, in the two-phase process, with, for example, a neutral or weakly acidic printing paste, passed through an alkaline bath containing an electrolyte or over-padded with an alkaline padding solution containing an electrolyte, and then treated by steaming or dry-heating. The printing paste used here may contain, for example, a size and/or emulsifier such as sodium alginate, starch ether or the like, and if necessary, may further contain, for example, a printing aid and/or dispersing agent such as urea or the like.

When a cellulose fiber is dyed or printed with the compound of the present invention, the acid-binding agent to be used is not particularly limited. Examples include alkali metal hydroxides, water-soluble basic salts formed by an alkali metal or alkaline earth metal with an inorganic or organic acid, compounds which release an alkali in a heated state and the like. Particularly mentioned are alkali metal hydroxides and alkali metal salts with an inorganic or organic acid of weak or medium strength. Among them, sodium or potassium hydroxide and sodium or potassium salts are preferred. As the acid-binding agent, in addition to the above described sodium carbonate, sodium bicarbonate, trisodium phosphate, sodium hydroxide and sodium silicate, potassium hydroxide, sodium formate, potassium carbonate, mono- or di-sodium phosphate, sodium trichloroacetate and the like can specifically be used.

When a synthetic or natural polyamide fiber or a polyurethane fiber is dyed by the exhaustion dyeing method, the compound of the present invention is exhausted into the fiber in an acidic or weakly acidic dyeing bath while controlling pH, which is then changed to neutral or alkaline nature. If necessary, a leveling agent such as a condensation product of cyanuryl chloride with aminobenzenesulfonic acid, a condensation product of cyanuryl chloride with aminonaphthalenesulfonic acid, an addition product of stearylamine with ethyleneoxide or the like, or other agent may be used.

The bisazo compound or a salt thereof of the present invention exhibits an excellent dyeing reproducibility and dyeing performances such as leveling property and washing-off property, and high build-up property and effective dyeing rate, in dyeing and printing onto fiber materials, particularly in dyeing and printing onto cellulose fibers. It also has an advantage of dyeing ability at a lower salt concentration.

The dyed product and printed product obtained with these compounds are good in various fastness such as good chlorine fastness, light fastness, perspiration fastness, perspiration-sunlight fastness, acid-hydrolysis fastness, alkali fastness, washing fastness and peroxide washing fastness.

The bisazo compound or a salt thereof of the present invention can be used, if necessary, in admixture with another dye insofar as the feature of the invention is adversely affected, in order to obtain a desired color tone. The dye usable in admixture is not particularly limited as far as it is a reactive dye. Examples include dyes having, as the reactive group, at least single group from at least one selected from sulfatoethylsulfone group, vinylsulfone group, monochlorotriazine group, monofluorotriazine group, mononicotinatetriadine group, dichlorotriazine group, difluoromonochloropyrimidine group and trichlorotriazine group, or dyes commercialized under group names of Sumifix, Sumifix Supra, Sumifix HF, Remazol, Levafix, Procion, Cibacron, Basilen, Drimarene, Kayacion, Kayacelon React and the like, dyes disclosed in JP-A-50-178, JP-A-56-9483, JP-A-56-15481, JP-A-56-118976, JP-A-56-128380, JP-A-57-2365, JP-A-57-89679, JP-A-57-143360, JP-A-59-15451, JP-A-58-191755, JP-A-59-96174, JP-A-59-161463, JP-A-60-6754, JP-A-60-123559, JP-A-60-229957, JP-A-60-260654, JP-A-61-126175, JP-A-61-155469, JP-A-61-225256, JP-A-63-77974, JP-A-63-225664, JP-A-1-185370, JP-A-3-770, JP-A-5-32907, JP-A-5-117536, JP-A-5-247366 and JP-A-6-287463, dyes represented by C. I. Reactive Blue, 19 and C. I. Reactive Black 5.

The bisazo compound and salts thereof according the present invention are useful as reactive dyes and they are excellent in dyeing performance, for example, build-up property, leveling property and the like. In addition, according to the process of the present invention, dyed products and printed products of dark-blue color which are excellent in various fastness can be obtained with good reproducibility.

EXAMPLES

The present invention will now be described in more detail with reference of Examples, which should not be construed as a limitation upon the scope of the invention. In Examples, part(s) means part(s) by weight.

Example 1

A compound, the free acid form of which is represented by the following formula (16):

(16)

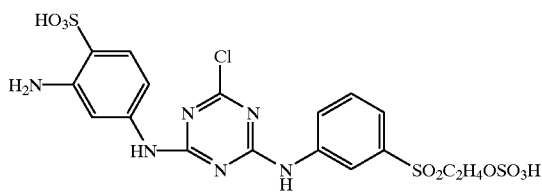

was obtained by condensing 3.69 parts of cyanuryl chloride and 3.76 parts of 2,4-diaminobenzenesulfonic acid in an aqueous medium at a pH of 1 to 4 and a temperature of −5° C. to +20 C., and then condensing the product with 5.63 parts of 1-aminobenzene-3-β-sulfatoethylsulfone at a pH of 2.5 to 7 and a temperature of 0° C. to 30° C., according to the conventional method.

Next, a compound, the free acid form of which is represented by the following formula (17):

(17)

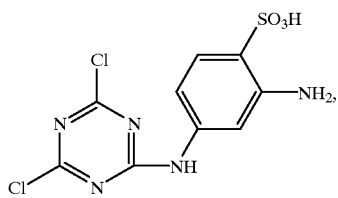

was obtained by condensing 3.69 parts of cyanaryl chloride and 3.76 parts of 2,4-diaminobenzenesulfonic acid at a pH of 1 to 4 and a temperature of −10° C. to +20° C., according to the conventional method. A bisazo compound (λmax: 604 nm, aqueous medium), the free acid form of which is represented by the following formula (18):

was obtained by diazotizing the compound of the above formula (16) according to the conventional method, then coupling with 6.39 parts of 1-amino-8-hydroxynaphthalene-3,6-disulfonic acid at a pH of 1 to 3.5 and a temperature of 0° C. to 30° C., subsequently coupling with the compound of the above formula (17) at a pH of 4 to 8 and a temperature of 0° C. to 30° C., followed by salting out or evaporating and drying the obtained product according to the conventional method.

Example 2

Corresponding bisazo compounds, respectively, are obtained by carrying out the same syntheses to that in Example 1, except for using compounds in column 2 in the following Tables 1 to 6 in place of the compound of the formula (17) used in Example 1, compounds in column 3 in the same Tables in place of 1-amino-8-hydroxynaphthalene-3,6-disulfonic acid, compounds in column 4 in the same Tables in place of 2,4-diaminobenzenesulfonic acid, compounds in column 5 in the same Tables in place of cyanuryl chloride, and compounds in column 6 in the same Tables in place of 1-aminobenzene-3-β-sulfatoethylsulfone.

In addition, the same compounds are obtained by changing the order of the first condensation and the second condensation with cyanuryl chloride in the above syntheses.

Furthermore, the same results are obtained by carrying out the same syntheses except for using the corresponding hydroxyl compounds in place of the compounds in column 6 of the same Tables (for example, when the compound in column 6 is 1-aminobenzene-3-β-sulfatoethylsulfone, using 1-aminobenzene-3-β-hydroxyethylsulfone), and, after the completion of the syntheses, forming sulfate ester according to the conventional method.

(18)

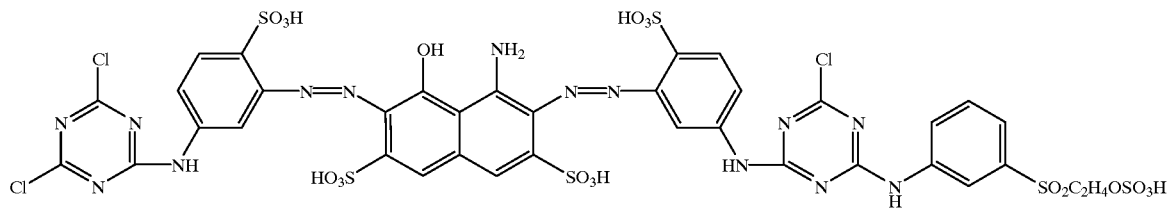

TABLE 1

| Column 1 | Column 2 | Column 3 | Column 4 | Column 5 | Column 6 |
|---|---|---|---|---|---|
| 1 | 2-amino-4-[(4,6-dichloropyrimidin-2-yl)amino]benzenesulfonic acid | 1-amino-8-hydroxynaphthalene-3,6-disulfonic acid | 2,4-diaminobenzenesulfonic acid | 2,4,6-trichloropyrimidine | $NH_2C_2H_4SO_2C_2H_4OSO_3H$ |
| 2 | 2-amino-4-[(4,6-dichloropyrimidin-2-yl)amino]benzenesulfonic acid | 1-amino-8-hydroxynaphthalene-3,6-disulfonic acid | 2,4-diaminobenzenesulfonic acid | 2,4,6-trichloropyrimidine | 3-amino-4-methoxyphenyl 2-(sulfatoethyl)sulfone |
| 3 | 2-amino-4-[(4,6-dichloropyrimidin-2-yl)amino]benzenesulfonic acid | 1-amino-8-hydroxynaphthalene-3,6-disulfonic acid | 2,4-diaminobenzenesulfonic acid | 2,4,6-trifluorotriazine | 4-aminophenyl 2-(sulfatoethyl)sulfone |

TABLE 1-continued
| Column 1 | Column 2 | Column 3 | Column 4 | Column 5 | Column 6 |
|---|---|---|---|---|---|
| 4 | 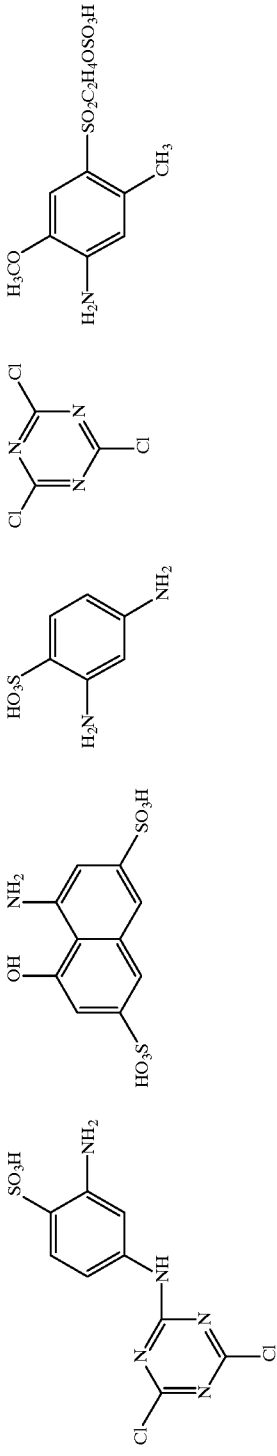 | 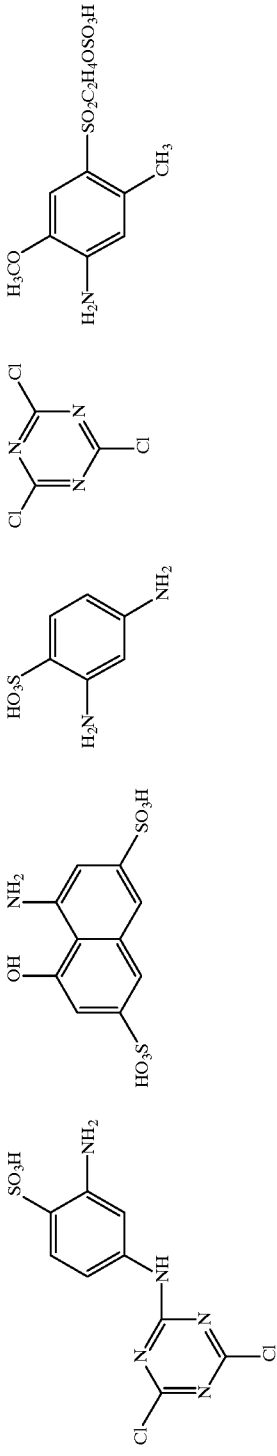 | 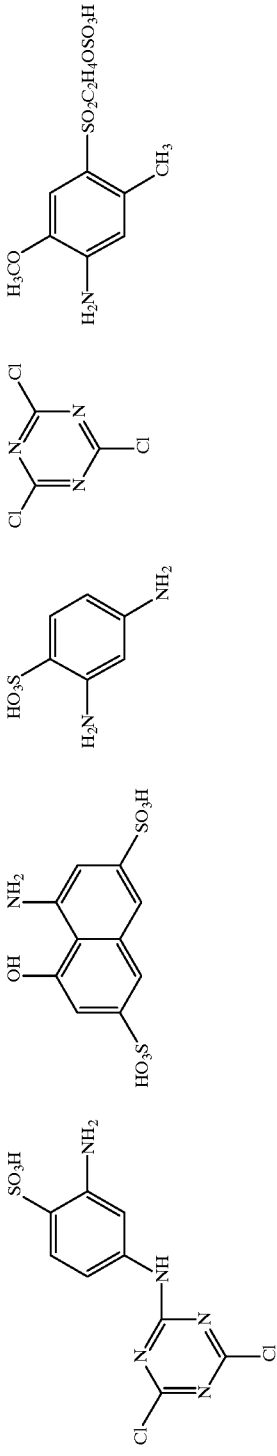 | 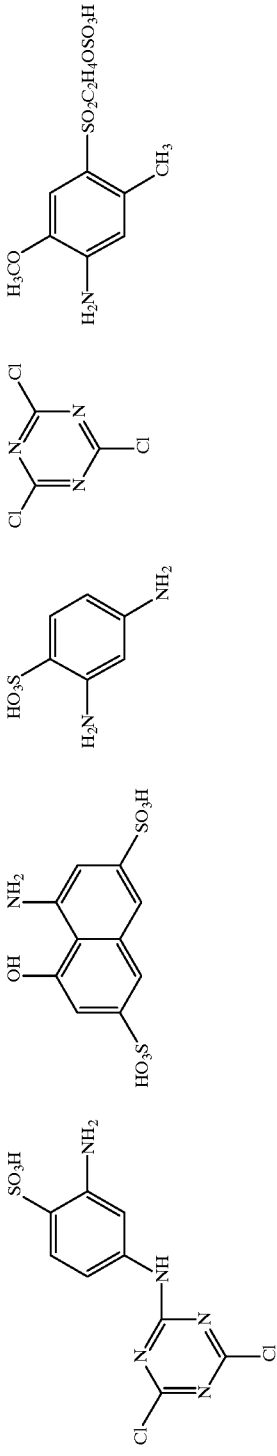 | 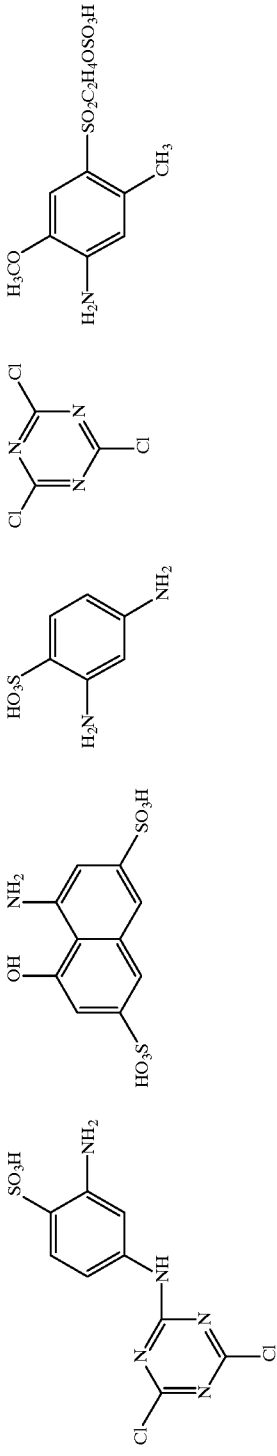 |
| 5 | 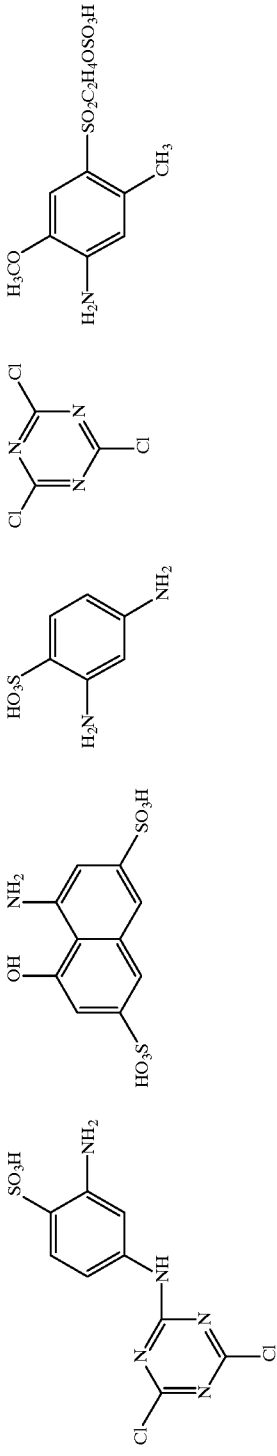 | 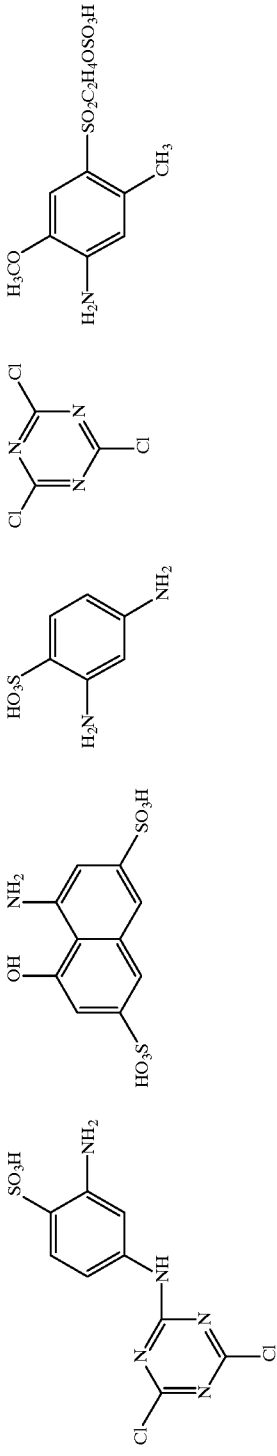 | 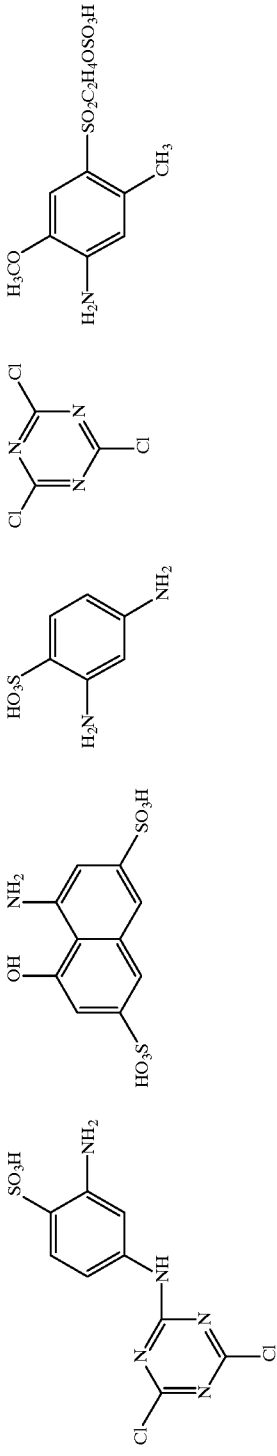 | 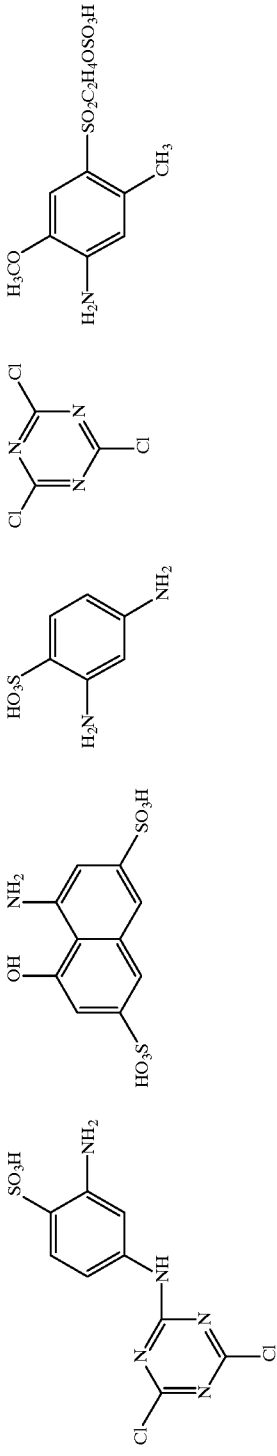 | 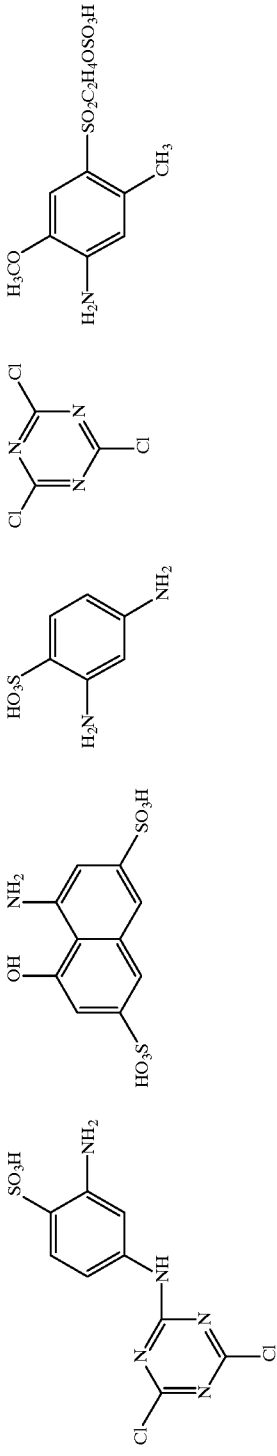 |

TABLE 2

| Column 1 | Column 2 | Column 3 | Column 4 | Column 5 | Column 6 |
|---|---|---|---|---|---|
| 6 | (structure) | (structure) | (structure) | (structure) | (structure) |
| 7 | (structure) | (structure) | (structure) | (structure) | (structure) |
| 8 | (structure) | (structure) | (structure) | (structure) | (structure) |

TABLE 2-continued

| Column 1 | Column 2 | Column 3 | Column 4 | Column 5 | Column 6 |
| --- | --- | --- | --- | --- | --- |
| 9 | 3-amino-4-sulfo-phenyl linked via NH to 4,6-dichloro-triazine | 1-amino-8-hydroxy-3,6-disulfo-naphthalene | 2,4-diamino-benzenesulfonic acid | 2,4,6-trichloro-triazine | N-ethyl-4-(β-sulfatoethylsulfonyl)aniline |
| 10 | 5-amino-4-sulfo-2-(4,6-dichloro-triazin-2-ylamino)-benzenesulfonic acid | 1-amino-8-hydroxy-3,6-disulfo-naphthalene | 2,4-diamino-benzenesulfonic acid | 2,4,6-trichloro-triazine | N-ethyl-4-(β-sulfatoethylsulfonyl)aniline |

TABLE 3

| Column 1 | Column 2 | Column 3 | Column 4 | Column 5 | Column 6 |
| --- | --- | --- | --- | --- | --- |
| 11 | 4-SO₃H, 3-NH₂-phenyl-NH-(4,6-dichloropyrimidin-2-yl) | 4-amino-5-hydroxy-2,7-naphthalenedisulfonic acid | 2-amino-4-aminobenzenesulfonic acid (HO₃S-, H₂N-) | 2,4,6-trichloropyrimidine | 3-(N-ethylamino)phenyl-SO₂C₂H₄OSO₃H |
| 12 | 4-SO₃H, 3-NH₂-phenyl-NH-(4,6-dichloropyrimidin-2-yl) | 4-amino-5-hydroxy-naphthalene-(NH₂, OH, SO₃H, HO₃S) | 2-amino-4-aminobenzenesulfonic acid | 2,4,6-trichloropyrimidine | 4-H₂N-phenyl-SO₂C₂H₄OSO₃H |
| 13 | 4-SO₃H, 3-NH₂-phenyl-NH-(4,6-dichloropyrimidin-2-yl) | 4-amino-5-hydroxy-2,7-naphthalenedisulfonic acid | 2-amino-4-aminobenzenesulfonic acid | 2,4,6-trifluorotriazine | 3-H₂N-phenyl-CONHC₂H₄SO₂CH=CH₂ |

TABLE 3-continued

| Column 1 | Column 2 | Column 3 | Column 4 | Column 5 | Column 6 |
|---|---|---|---|---|---|
| 14 | 2,4-dichloro-triazinyl-NH-phenyl (SO₃H, NH₂, OCH₃ substituents) | 8-amino-1-hydroxy-naphthalene-3,6-disulfonic acid | 4-sulfo-1,3-phenylenediamine | 2,4,6-trichloro-triazine | 4-aminophenyl-SO₂C₂H₄OSO₂H |
| 15 | 4,6-dichloro-triazinyl-NH-phenyl (SO₃H, NH₂ substituents) | 8-amino-1-hydroxy-naphthalene-3,6-disulfonic acid | 4-sulfo-1,3-phenylenediamine | 2,4,6-trichloro-triazine | 3-aminophenyl-CONHC₂H₄SO₂CH=CH₂ |

TABLE 4

| Column 1 | Column 2 | Column 3 | Column 4 | Column 5 | Column 6 |
|---|---|---|---|---|---|
| 16 | 4-(4,6-dichloropyrimidin-2-ylamino)-2-aminobenzenesulfonic acid | 8-amino-1-hydroxynaphthalene-3,6-disulfonic acid | 2-amino-4-aminobenzenesulfonic acid (1,3-diamino-4-sulfo) | 2,4,6-trifluoro-1,3,5-triazine | 3-amino-4-sulfo-benzamide with CONHC₂H₄SO₂CH=CH₂ |
| 17 | 4-(4,6-dichloropyrimidin-2-ylamino)-2-aminobenzenesulfonic acid | 8-amino-1-hydroxynaphthalene-3,6-disulfonic acid | 2-amino-4-aminobenzenesulfonic acid | 2,4,6-trichloro-1,3,5-triazine | 4-(N-ethylamino)phenyl-SO₂C₂H₄OSO₃H |
| 18 | 4-(4,6-dichloropyrimidin-2-ylamino)-2-aminobenzenesulfonic acid | 8-amino-1-hydroxynaphthalene-3,6-disulfonic acid | 2-amino-4-aminobenzenesulfonic acid | 2,4,6-trifluoro-1,3,5-triazine | NH₂C₂H₄OC₂H₄SO₂CH=CH₂ |

(Note: Column entries are chemical structures; textual descriptions provided as best interpretation of the depicted structures.)

TABLE 4-continued

| Column 1 | Column 2 | Column 3 | Column 4 | Column 5 | Column 6 |
| --- | --- | --- | --- | --- | --- |
| 19 | 2-amino-4-(4,6-dichloropyrimidin-2-ylamino)benzenesulfonic acid | 4-amino-5-hydroxynaphthalene-2,7-disulfonic acid | 2,4-diaminobenzenesulfonic acid | 2,4,6-trichloro-1,3,5-triazine | $NH_2C_2H_4OC_2H_4SO_2CH=CH_2$ |
| 20 | 2-amino-4-(4,6-dichloropyrimidin-2-ylamino)benzenesulfonic acid | 4-amino-5-hydroxynaphthalene-2,7-disulfonic acid | 2,4-diaminobenzenesulfonic acid | 2,4,6-trifluoro-1,3,5-triazine | 3-(N-ethylamino)phenyl-$SO_2C_2H_4OSO_3H$ |

TABLE 5

| Column 1 | Column 2 | Column 3 | Column 4 | Column 5 | Column 6 |
|---|---|---|---|---|---|
| 21 | 4-sulfo-3-amino-phenyl-NH-(4,6-dichloropyrimidin-2-yl) | 8-amino-1-hydroxy-3,6-disulfo-naphthalene | 2,4-diaminobenzenesulfonic acid (1-amino-2-sulfo, 4-amino) | 2,4,6-trichloropyrimidine | 4-aminophenyl-$SO_2C_2H_4OSO_3H$ |
| 22 | 4-sulfo-3-amino-phenyl-NH-(4,6-dichloropyrimidin-2-yl) | 8-amino-1-hydroxy-3,6-disulfo-naphthalene | 2,4-diaminobenzenesulfonic acid | 2,4,6-trichloropyrimidine | 4-(N-ethylamino)phenyl-$SO_2C_2H_4OSO_3H$ |
| 23 | 4-sulfo-3-amino-phenyl-NH-(4,6-dichloropyrimidin-2-yl) | 8-amino-1-hydroxy-3,6-disulfo-naphthalene | 2,4-diamino-1-sulfobenzene | 2,4,6-trifluoropyrimidine | 4-(N-ethylamino)phenyl-$SO_2C_2H_4OSO_3H$ |

TABLE 5-continued

| Column 1 | Column 2 | Column 3 | Column 4 | Column 5 | Column 6 |
|---|---|---|---|---|---|
| 24 | 4-sulfo-3-amino-anilino-(4,6-dichloropyrimidin-2-yl) | 8-amino-1-hydroxy-naphthalene-3,6-disulfonic acid | 4-sulfo-3-amino-aniline | 2,4,6-trifluoro-1,3,5-triazine | $NH_2C_2H_4SO_2C_2H_4OSO_3H$ |
| 25 | 4-sulfo-3-amino-anilino-(4,6-dichloropyrimidin-2-yl) | 8-amino-1-hydroxy-naphthalene-3,6-disulfonic acid | 4-sulfo-3-amino-aniline | 2,4,6-trichloropyrimidine | 1-sulfo-2-amino-6-($SO_2C_2H_4OSO_3H$)-naphthalene |

TABLE 6

| Column 1 | Column 2 | Column 3 | Column 4 | Column 5 | Column 6 |
| --- | --- | --- | --- | --- | --- |
| 26 | | | | | NHC₂H₄SO₂C₂H₄OSO₃H, C₂H₅ |
| 27 | | | | | 4-(C₂H₅NH)-C₆H₄-SO₂C₂H₄OSO₃H |
| 28 | | | | | 4-(H₂N)-C₆H₄-SO₂C₂H₄OSO₃H |

TABLE 6-continued

| Column 1 | Column 2 | Column 3 | Column 4 | Column 5 | Column 6 |
|---|---|---|---|---|---|
| 29 | 2-amino-4-[N-ethyl-N-(4,6-dichloro-1,3,5-triazin-2-yl)amino]benzenesulfonic acid | 4-amino-5-hydroxy-2,7-naphthalenedisulfonic acid | 3-amino-4-(ethylamino)benzenesulfonic acid | cyanuric chloride | NHC₂H₄OC₂H₄SO₂C₂H₄OSO₃H, CH₃ |
| 30 | 2-amino-5-[N-methyl-N-(4,6-dichloro-1,3,5-triazin-2-yl)amino]benzenesulfonic acid | 4-amino-5-hydroxy-2,7-naphthalenedisulfonic acid | 4-amino-2-methyl-5-sulfoaniline | cyanuric chloride | NHC₂H₄SO₂C₂H₄OSO₃H (phenyl) |

Example 3

A bisazo compound, the free of which is represented by the following formula (19);

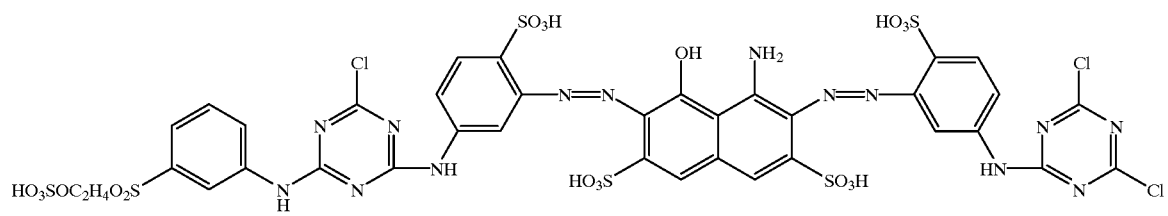

(19)

can be obtained by synthesizing the compounds of the formulae (16) and (17), diazoting the compound of the formula (17) according to the conventional method, then coupling with 6.39 parts of 1-amino-8-hydroxynaphthalene-3,6-disulfonic acid at a pH of 1 to 3.5 and a temperature of 0° C. to 30° C., subsequently coupling with the compound of the above formula (16) at a pH of 4 to 8 and a temperature of 0° C. to 30° C., and salting out or evaporating and drying the obtained product according to the conventional method.

Example 4

Corresponding bisazo compounds, respectively, are obtained by carrying out the same syntheses to that in Example 3, except for using compounds in column 2 in the following Tables 7 to 9 in place of 1-aminobenzene-3-β-sulfatoethylsulfone used in Example 3, compounds in column 3 in the same Tables in place of cyanuryl chloride, compounds in column 4 in the same Tables in place of 2,4-diaminobenzenesulfonic acid, compounds in column 5 in the same Tables in place of 1-amino-8-hydroxynaphthalene- 3,6-disulfonic acid, and compounds in column 6 in the same Tables in place of the compound of the above formula (17).

The same compounds are obtained by changing the order of the first condensation and the second condensation with cyanuryl chloride in the above syntheses.

Furthermore, the same results are obtained by carrying out the syntheses using the corresponding hydroxyl compounds in place of the compounds in column 2 of Tables 7 to 9 (for example, when the compound in column 2 is 1-aminobenzene-3-β-sulfatoethylsulfone, using 1-aminobenzene-3-β-hydroxyethylsulfone), and, after completion of the syntheses, forming sulfate ester according to the conventional method.

TABLE 7

| Column 1 | Column 2 | Column 3 | Column 4 | Column 5 | Column 6 |
|---|---|---|---|---|---|
| 1 | 4-aminophenyl-SO$_2$C$_2$H$_4$OSO$_3$H | 2,4,6-trichloropyrimidine | 2,4-diamino-benzenesulfonic acid (HO$_3$S / H$_2$N / NH$_2$) | 8-amino-1-hydroxy-naphthalene-3,6-disulfonic acid | 2-amino-4-[(4,6-dichloropyrimidin-2-yl)amino]benzenesulfonic acid |
| 2 | NH$_2$C$_2$H$_4$SO$_2$C$_2$H$_4$OSO$_3$H | 2,4,6-trichloropyrimidine | 2,4-diamino-benzenesulfonic acid | 8-amino-1-hydroxy-naphthalene-3,6-disulfonic acid | 2-amino-4-[(4,6-dichloropyrimidin-2-yl)amino]benzenesulfonic acid |
| 3 | 3-amino-4-sulfophenyl-CONHC$_2$H$_4$SO$_2$CH=CH$_2$ | 2,4,6-trifluoropyrimidine | 2,4-diamino-benzenesulfonic acid | 8-amino-1-hydroxy-naphthalene-3,6-disulfonic acid | 2-amino-4-[(4,6-dichloropyrimidin-2-yl)amino]benzenesulfonic acid |

TABLE 7-continued

| Column 1 | Column 2 | Column 3 | Column 4 | Column 5 | Column 6 |
| --- | --- | --- | --- | --- | --- |
| 4 | 3-($C_2H_5$)HN-C$_6$H$_4$-SO$_2$C$_2$H$_4$OSO$_3$H | 2,4,6-trichloropyrimidine | 1-SO$_3$H, 2-NH$_2$ aniline (4-amino-2-aminobenzenesulfonic acid) | 1-amino-8-hydroxynaphthalene-3,6-disulfonic acid | 4-(4,6-dichloropyrimidin-2-ylamino)-2-amino-1-benzenesulfonic acid |
| 5 | 4-($C_2H_5$)HN-C$_6$H$_4$-SO$_2$C$_2$H$_4$OSO$_3$H | 2,4,6-trichloropyrimidine | 1-SO$_3$H, 2-NH$_2$ aniline (4-amino-2-aminobenzenesulfonic acid) | 1-amino-8-hydroxynaphthalene-3,6-disulfonic acid | 4-(4,6-dichloropyrimidin-2-ylamino)-2-amino-1-benzenesulfonic acid |

TABLE 8

| Column 1 | Column 2 | Column 3 | Column 4 | Column 5 | Column 6 |
|---|---|---|---|---|---|
| 6 | 4-(ethylamino)phenyl-SO$_2$C$_2$H$_4$OSO$_3$H | 2,4,6-trifluoro-triazine | 2,4-diamino-benzenesulfonic acid | 4-amino-5-hydroxy-naphthalene-2,7-disulfonic acid | 3-amino-4-(4,6-dichloropyrimidin-2-ylamino)-benzenesulfonic acid |
| 7 | 4-(methylamino)phenyl-SO$_2$C$_2$H$_4$OSO$_3$H | 2,4,6-trichloro-pyrimidine | 2,4-diamino-benzenesulfonic acid | 4-amino-5-hydroxy-naphthalene-1,7-disulfonic acid | 3-amino-4-[N-methyl-N-(4,6-dichloropyrimidin-2-yl)amino]-benzenesulfonic acid |
| 8 | 4-aminophenyl-SO$_2$C$_2$H$_4$OSO$_3$H | 2,4,6-trichloro-pyrimidine | 2,4-diamino-benzenesulfonic acid | 4-amino-5-hydroxy-naphthalene-1,7-disulfonic acid | 3-amino-4-(4,6-dichloropyrimidin-2-ylamino)-benzenesulfonic acid |

TABLE 8-continued
| Column 1 | Column 2 | Column 3 | Column 4 | Column 5 | Column 6 |
|---|---|---|---|---|---|
| 9 | NH$_2$C$_2$H$_4$OC$_2$H$_4$SO$_2$CH=CH$_2$ | 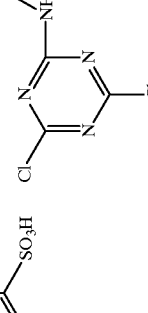 | 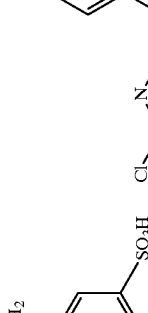 | 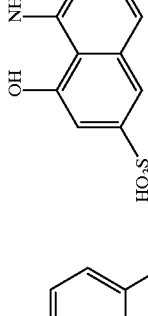 | 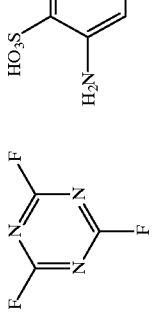 |
| 10 | 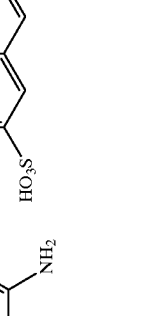 (H$_2$N—C$_6$H$_4$—SO$_2$C$_2$H$_4$OSO$_2$H) | 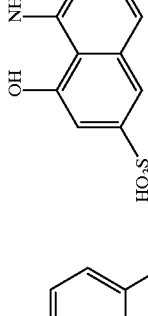 | 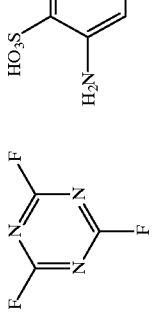 | 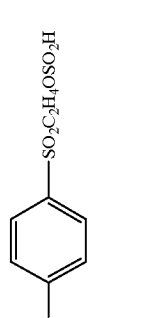 |  |

TABLE 9

| Column 1 | Column 2 | Column 3 | Column 4 |
|---|---|---|---|
| 11 | C₂H₅-NH-C₆H₄-SO₂C₂H₄OSO₃H | cyanuryl chloride | 2,4-diaminobenzenesulfonic acid (HO₃S on ring, H₂N-, -NH₂) |
| 12 | H₂N-C₆H₄-SO₂C₂H₄OSO₂H | cyanuryl chloride | 2,4-diaminobenzenesulfonic acid |

| Column 1 | Column 5 | Column 6 |
|---|---|---|
| 11 | 1-amino-8-hydroxy-3,6-disulfonaphthalene (H-acid: OH, NH₂, HO₃S, SO₃H) | dichlorotriazinyl-NH linked to 3-amino-4-sulfophenyl (SO₃H, NH₂) |
| 12 | 1-amino-8-hydroxy-3,6-disulfonaphthalene (H-acid) | dichlorotriazinyl-NH linked to 3-amino-4-sulfophenyl |

Example 5

A compound, the free acid of which is represented by the following formula (20):

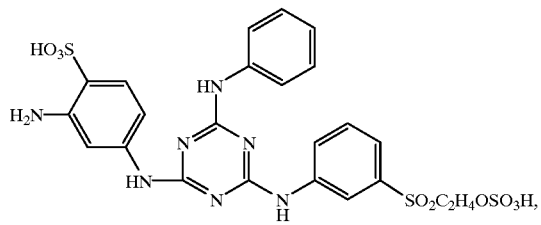

(20)

is obtained by condensing 3.69 parts of cyanuryl chloride and 3.76 parts of 2,4-diaminobenzenesulfonic acid in an aqueous medium at a pH of 1 to 4 and a temperature of −5° C. to +20° C. and then condensing the product with 5.63 parts of 1-aminobenzene-3-β-sulfatoethylsulfone at a pH of 2.5 to 7 and a temperature of 0° C. to 30° C., followed by condensing the resulting compound with 1.86 parts of aniline at a pH of 1 to 4 and a temperature of 30° C. to 80° C. for 1 to 8 hours, according to the conventional method.

A bisazo compound, the free acid form of which is represented by the following formula (21):

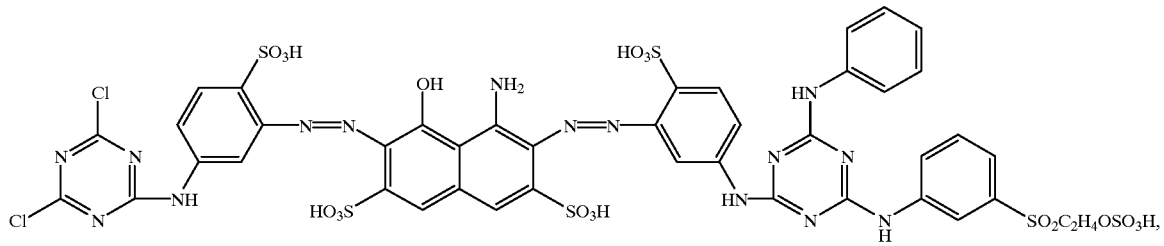

(21)

was obtained by diazotizing the compound of the above formula (20) according to the conventional method, then coupling with 6.39 parts of 1-amino-8-hydroxynaphthalene-3,6-disulfonic acid at a pH of 1 to 3.5 and a temperature of 0° C. to 30° C., subsequently coupling with the compound of the above formula (17) at a pH of 4 to 8 and a temperature of 0° C. to 30° C., followed by salting out or evaporating and drying the obtained product according to the conventional method.

Example 6

Corresponding bisazo compounds, respectively, are obtained by carrying out the same syntheses to that in Example 5, except for using compounds in column 2 in the following Tables 10 to 15 in place of the compound of the formula (17) used in Example 5, compounds in column 3 in the same Tables in place of 1-amino-8-hydroxynaphthalene-3,6-disulfonic acid, compounds in column 4 In the same Tables in place of 2,4-diaminobenzenesulfonic acid, compounds in column 5 in the same Tables in place of 1-aminobenzene-3-β-sulfatoethylsulfone, and compounds in column 6 in the same Tables in place of aniline.

In addition, the same compounds are obtained by changing the order of the first condensation and the second condensation with cyanuryl chloride in the above syntheses.

Furthermore, when the compounds in column 5 and column 6 of the same Tables have sulfatoethylsulfonyl group, the same results are obtained by carrying out the same syntheses except for using the corresponding hydroxyl compounds in place of the compounds in column 5 and column 6 of the same Tables (for example, when the compound in column 5 is 1-aminobenzene-3-β-sulfatoethylsulfone, using 1-aminobenzene-3-β-hydroxyethylsulfone, and when the compound in column 6 is 2-(β-sulfatoethylsulfonyl)ethyl amine, using 2-(β-hydroxyethylsulfonyl)ethyl amine), and, after the completion of the syntheses, forming sulfate ester according to the conventional method.

In addition, the same results are obtained by replacing the cyanuryl chloride with cyanuryl fluoride.

TABLE 10

| Column 1 | Column 2 | Column 3 | Column 4 | Column 5 | Column 6 |
|---|---|---|---|---|---|
| 1 | 2-amino-4-[(4,6-dichloropyrimidin-2-yl)amino]benzenesulfonic acid | 8-amino-1-hydroxynaphthalene-3,6-disulfonic acid | 2,4-diaminobenzenesulfonic acid | 4-aminophenyl-SO$_2$C$_2$H$_4$OSO$_2$H | 2-ethylaniline |
| 2 | 2-amino-4-[(4,6-dichloropyrimidin-2-yl)amino]benzenesulfonic acid | 8-amino-1-hydroxynaphthalene-3,6-disulfonic acid | 2,4-diaminobenzenesulfonic acid | 4-aminophenyl-SO$_2$C$_2$H$_4$OSO$_2$H | 3-aminobenzenesulfonic acid |
| 3 | 2-amino-4-[(4,6-dichloropyrimidin-2-yl)amino]benzenesulfonic acid | 8-amino-1-hydroxynaphthalene-3,6-disulfonic acid | 2,4-diaminobenzenesulfonic acid | 4-aminophenyl-SO$_2$C$_2$H$_4$OSO$_2$H | NH$_2$CH$_2$CH$_2$SO$_3$H |

TABLE 10-continued

| Column 1 | Column 2 | Column 3 | Column 4 | Column 5 | Column 6 |
| --- | --- | --- | --- | --- | --- |
| 4 | 4-[(4,6-dichloropyrimidin-2-yl)amino]-2-aminobenzenesulfonic acid | 8-amino-1-hydroxy-3,6-naphthalenedisulfonic acid | 2,4-diaminobenzenesulfonic acid | 4-aminophenyl-β-sulfatoethylsulfone | $NH_2CH_2CH_2OH$ |
| 5 | 4-[(4,6-dichloropyrimidin-2-yl)amino]-2-aminobenzenesulfonic acid | 8-amino-1-hydroxy-3,6-naphthalenedisulfonic acid | 2,4-diaminobenzenesulfonic acid | 4-aminophenyl-β-sulfatoethylsulfone | $NH_3$ |

TABLE 11

| Column 1 | Column 2 | Column 3 | Column 4 | Column 5 | Column 6 |
|---|---|---|---|---|---|
| 6 | 2-amino-4-(4,6-dichloropyrimidin-2-ylamino)benzenesulfonic acid | 8-amino-1-hydroxy-3,6-naphthalenedisulfonic acid | 2-amino-4-aminobenzenesulfonic acid | 4-amino-phenyl-SO₂C₂H₄OSO₂H | 2-amino-1,4-benzenedisulfonic acid |
| 7 | 2-amino-4-(4,6-dichloropyrimidin-2-ylamino)benzenesulfonic acid | 8-amino-1-hydroxy-3,6-naphthalenedisulfonic acid | 2-amino-4-aminobenzenesulfonic acid | 4-amino-phenyl-SO₂C₂H₄OSO₂H | HOCH₃ |
| 8 | 2-amino-4-(4,6-dichloropyrimidin-2-ylamino)benzenesulfonic acid | 8-amino-1-hydroxy-3,6-naphthalenedisulfonic acid | 2-amino-4-aminobenzenesulfonic acid | 4-amino-phenyl-SO₂C₂H₄OSO₂H | morpholine |

TABLE 11-continued

| Column 1 | Column 2 | Column 3 | Column 4 | Column 5 | Column 6 |
|---|---|---|---|---|---|
| 9 | | | | | |
| 10 | | | | | |

TABLE 12

| Column 1 | Column 2 | Column 3 | Column 4 | Column 5 | Column 6 |
| --- | --- | --- | --- | --- | --- |
| 11 | (structure) | (structure) | (structure) | (structure) | (structure) |
| 12 | (structure) | (structure) | (structure) | (structure) | (structure) |
| 13 | (structure) | (structure) | (structure) | (structure) | $NH_2CH_2CH_2OH$ |

TABLE 12-continued

| Column 1 | Column 2 | Column 3 | Column 4 | Column 5 | Column 6 |
| --- | --- | --- | --- | --- | --- |
| 14 | (structure) | (structure) | (structure) | (structure) | (structure) |
| 15 | (structure) | (structure) | (structure) | (structure) | (structure) |

TABLE 13

| Column 1 | Column 2 | Column 3 | Column 4 | Column 5 | Column 6 |
|---|---|---|---|---|---|
| 16 | | | | | |
| 17 | | | | $NH_2C_2H_4SO_2C_2H_4OSO_3H$ | |
| 18 | | | | $NH_2C_2H_4SO_2C_2H_4OSO_3H$ | |

TABLE 13-continued

| Column 1 | Column 2 | Column 3 | Column 4 | Column 5 | Column 6 |
|---|---|---|---|---|---|
| 19 | 4-(4,6-dichloropyrimidin-2-ylamino)-2-aminobenzenesulfonic acid | 8-amino-1-hydroxynaphthalene-3,6-disulfonic acid | 2-amino-4-aminobenzenesulfonic acid (H₂N at 3, NH₂ at 4-position shown) | $NH_2C_2H_4OC_2H_4SO_2CH=CH_2$ | 2-ethylaniline |
| 20 | 4-(4,6-dichloropyrimidin-2-ylamino)-2-aminobenzenesulfonic acid | 8-amino-1-hydroxynaphthalene-3,6-disulfonic acid | 2-amino-4-aminobenzenesulfonic acid | $NH_2C_2H_4OC_2H_4SO_2CH=CH_2$ | morpholine |

TABLE 14

| Column 1 | Column 2 | Column 3 | Column 4 | Column 5 | Column 6 |
|---|---|---|---|---|---|
| 21 | 4-SO₃H, 3-NH₂-phenyl-NH-(4,6-dichloropyrimidin-2-yl) | 8-amino-1-hydroxy-naphthalene-3,6-disulfonic acid | 4-HO₃S, 2-H₂N, 4-NH₂-aniline | 4-(H₂N)-C₆H₄-SO₂C₂H₄OSO₃H | NH₂CH₂CH₂SO₃H |
| 22 | 4-SO₃H, 3-NH₂-phenyl-NH-(4,6-dichloropyrimidin-2-yl) | 5-amino-8-hydroxy-naphthalene-1,6-disulfonic acid | 4-HO₃S, 2-H₂N, 4-NH₂-aniline | 3-(C₂H₅NH)-C₆H₄-SO₂C₂H₄OSO₃H | 3-(H₂N)-C₆H₄-SO₂C₂H₄OSO₃H |
| 23 | 4-SO₃H, 3-NH₂-phenyl-NH-(4,6-dichloropyrimidin-2-yl) | 5-amino-8-hydroxy-naphthalene-1,6-disulfonic acid | 4-HO₃S, 2-H₂N, 4-NH₂-aniline | 4-(H₂N)-C₆H₄-SO₂C₂H₄OSO₃H | NH₂CH₂CH₂OH |

TABLE 14-continued

| Column 1 | Column 2 | Column 3 | Column 4 | Column 5 | Column 6 |
|---|---|---|---|---|---|
| 24 | 4-[(4,6-dichloropyrimidin-2-yl)amino]-2-aminobenzenesulfonic acid | 4-amino-5-hydroxy-naphthalene-2,7-disulfonic acid | 2,4-diaminobenzenesulfonic acid | 4-aminophenyl-SO$_2$C$_2$H$_4$OSO$_3$H | HOCH$_3$ |
| 25 | 4-[(4,6-dichloropyrimidin-2-yl)amino]-2-aminobenzenesulfonic acid | 4-amino-5-hydroxy-naphthalene-2,7-disulfonic acid | 2,4-diaminobenzenesulfonic acid | 4-(ethylamino)phenyl-SO$_2$C$_2$H$_4$OSO$_3$H | NH$_2$C$_4$H$_4$OC$_2$H$_4$OH |

TABLE 15

| Column 1 | Column 2 | Column 3 | Column 4 | Column 5 | Column 6 |
|---|---|---|---|---|---|
| 26 | | | | | |
| 27 | | | | | |
| 28 | | | | | |

TABLE 15-continued

| Column 1 | Column 2 | Column 3 | Column 4 | Column 5 | Column 6 |
|---|---|---|---|---|---|
| 29 | 4-(4,6-dichloropyrimidin-2-ylamino)-2-aminobenzenesulfonic acid | 8-amino-1-hydroxy-3,6-naphthalenedisulfonic acid | 2,4-diaminobenzenesulfonic acid | 4-amino-phenyl-SO$_2$C$_2$H$_4$OSO$_3$H | NH$_2$CH$_2$CH$_2$SO$_3$H |
| 30 | 4-(4,6-dichloropyrimidin-2-ylamino)-2-aminobenzenesulfonic acid | 8-amino-1-hydroxy-3,6-naphthalenedisulfonic acid | 2,4-diaminobenzenesulfonic acid | 4-(ethylamino)phenyl-SO$_2$C$_2$H$_4$OSO$_3$H | morpholine |

Example 7

A bisazo compound, the free of which is represented by the following formula (22):

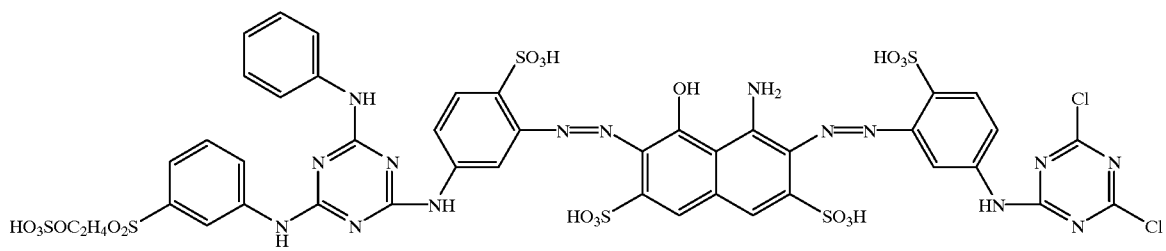

(22)

can be obtained by synthesizing the compounds of the formulae (20) and (17), diazotizing the compound of the formula (17) according to the conventional method, then coupling with 6.39 parts of 1-amino-8-hydroxynaphthalene-3,6-disulfonic acid at a pH of 1 to 3.5 and a temperature of 0° C. to 30° C., subsequently coupling with the compound of the above formula (20) at a pH of 4 to 8 and a temperature of 0° C. to 30° C., and salting out or evaporating and drying the obtained product according to the conventional method.

Example 8

Corresponding bisazo compounds, respectively, are obtained by carrying out the same syntheses to that in Example 7, except for using compounds in column 2 in the following Tables 16 to 17 in place of aniline used in Example 7, compounds in column 3 in the same Tables in place of 1-aminobenzene-3-β-sulfatoethylsulfone, compounds in column 4 in the same Tables in place of 2,4-diaminobenzenesulfonic acid, compounds in column 5 in the same Tables in place of 1-amino-8-hydroxynaphthalene-3,6-disulfonic acid, and compounds in column 6 in the same Tables in place of the compound of the above formula (17).

In addition, the same compounds are obtained by changing the order of the first condensation and the second condensation with cyanuryl chloride in the above syntheses.

Furthermore, when the compounds in column 3 and column 2 of the same Tables have sulfatoethylsulfonyl group, the same results are obtained by carrying out the same syntheses except for using the corresponding hydroxyl compounds in place of the compounds in column 3 and column 2 of the same Tables (for example, when the compound in column 3 is 1-aminobenzene-3-β-sulfatoethylsulfone, using 1-aminobenzene-3-β-hydroxyethylsulfone, and when the compound in column 2 is 2-(β-sulfatoethylsulfonyl)ethyl amine, using 2-(β-hydroxyethylsulfonyl)ethyl amine), and, after the completion of the syntheses, forming sulfate ester according to the conventional method.

In addition, the same results are obtained by replacing the cyanuryl chloride with cyanuryl fluorides.

TABLE 16

| Column 1 | Column 2 | Column 3 | Column 4 | Column 5 | Column 6 |
|---|---|---|---|---|---|
| 1 | 3-aminobenzenesulfonic acid (H₂N-C₆H₄-SO₃H) | 4-aminophenyl-SO₂C₂H₄OSO₂H | 2,4-diaminobenzenesulfonic acid | 8-amino-1-hydroxynaphthalene-3,6-disulfonic acid | 4-[(4,6-dichloropyrimidin-2-yl)amino]-2-aminobenzenesulfonic acid |
| 2 | $NH_2CH_2CH_2SO_3H$ | 4-aminophenyl-SO₂C₂H₄OSO₂H | 2,4-diaminobenzenesulfonic acid | 8-amino-1-hydroxynaphthalene-3,6-disulfonic acid | 4-[(4,6-dichloropyrimidin-2-yl)amino]-2-aminobenzenesulfonic acid |
| 3 | $NHCH_2CH_2OH$ / $CH_3$ | 4-aminophenyl-SO₂C₂H₄OSO₂H | 2,4-diaminobenzenesulfonic acid | 8-amino-1-hydroxynaphthalene-3,6-disulfonic acid | 4-[(4,6-dichloropyrimidin-2-yl)amino]-2-aminobenzenesulfonic acid |

TABLE 16-continued

| Column 1 | Column 2 | Column 3 | Column 4 | Column 5 | Column 6 |
|---|---|---|---|---|---|
| 4 | NH$_3$ | 4-aminophenyl-SO$_2$C$_2$H$_4$OSO$_2$H | 2,4-diamino-benzenesulfonic acid | 8-amino-1-hydroxynaphthalene-3,6-disulfonic acid | 3-amino-4-sulfo-phenylamino dichlorotriazine |
| 5 | HOCH$_3$ | 4-aminophenyl-SO$_2$C$_2$H$_4$OSO$_2$H | 2,4-diamino-benzenesulfonic acid | 8-amino-1-hydroxynaphthalene-3,6-disulfonic acid | 3-amino-4-sulfo-phenylamino dichlorotriazine |

TABLE 17

| Column 1 | Column 2 | Column 3 | Column 4 | Column 5 | Column 6 |
|---|---|---|---|---|---|
| 6 | HOC$_2$H$_4$OC$_2$H$_4$ | 4-aminophenyl-SO$_2$C$_2$H$_4$OSO$_3$H | 2-amino-4-aminobenzenesulfonic acid | 8-amino-1-hydroxy-3,6-disulfonaphthalene | 3-amino-4-sulfoanilino-dichlorotriazine |
| 7 | | N-ethyl-4-aminophenyl-SO$_2$C$_2$H$_4$OSO$_3$H; 4-aminophenyl-SO$_2$C$_2$H$_4$OSO$_3$H | 2-amino-4-aminobenzenesulfonic acid | 8-amino-1-hydroxy-3,6-disulfonaphthalene | 3-amino-4-sulfoanilino-dichlorotriazine |
| 8 | | N-ethyl-4-aminophenyl-SO$_2$C$_2$H$_4$OSO$_3$H; phenol | 2-amino-4-aminobenzenesulfonic acid | 8-amino-1-hydroxy-3,6-disulfonaphthalene | 3-amino-4-sulfoanilino-dichlorotriazine |

TABLE 17-continued

| Column 1 | Column 2 | Column 3 | Column 4 | Column 5 | Column 6 |
|---|---|---|---|---|---|
| 9 | 2-amino-ethylbenzene (H₂N–C₆H₄–C₂H₅) | NH₂C₂H₄SO₂C₂H₄OSO₃H | 4-amino-2-aminobenzene sulfonic acid (HO₃S–C₆H₃(NH₂)–NH₂) | 8-amino-1-hydroxynaphthalene-3,6-disulfonic acid derivative | 4-[(4,6-dichloro-1,3,5-triazin-2-yl)amino]-2-aminobenzenesulfonic acid |
| 10 | 4-(2-sulfatoethylsulfonyl)aniline (H₂N–C₆H₄–SO₂C₂H₄OSO₂H) | NH₂C₂H₄SO₂C₂H₄OSO₃H | 4-amino-2-aminobenzene sulfonic acid (HO₃S–C₆H₃(NH₂)–NH₂) | 8-amino-1-hydroxynaphthalene-3,6-disulfonic acid derivative | 4-[(4,6-dichloro-1,3,5-triazin-2-yl)amino]-2-aminobenzenesulfonic acid |

Example 9

According to the conventional method, 3.69 parts of cyanuryl chloride and 5.63 parts of 1-aminobenzene-3-β-sulfatoethylsulfone are condensed in an aqueous medium at a pH of 5 to 8 and a temperature of −5° C. to +10° C., and then the resulting product is condensed with 3.76 parts of 2,4-diaminobenzene-sulfonic acid at a pH of 2 to 6 and a temperature of 0° C. to +25° C. The compound thus obtained is diazotized.

A compound, the free acid form of which is represented by the following formula (23):

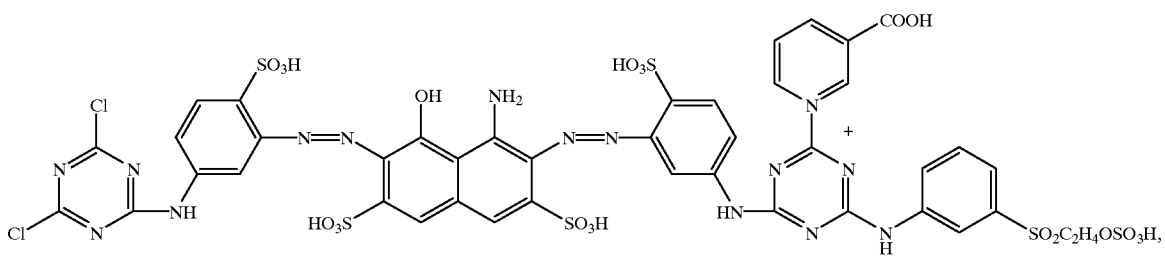

(23)

was obtained by coupling the diazotized compound with 6.39 parts of 1-amino-8-hydroxynaphthalene-3,6-disulfonic acid at a pH of 1 to 3.5 and a temperature of 0° C. to +15° C., then coupling with 2.46 parts of 3-carboxypyridinio at a pH of 2 to 4 and a temperature of +40° C. to +100° C., subsequently coupling with the compound of the above formula (17) at a pH of 4 to 8 and a temperature of 0° C. to 30° C., followed by salting out or evaporating and drying the obtained product according to the conventional method.

Example 10

Corresponding bisazo compounds, respectively, are obtained by carrying out the same syntheses to that in Example 9, except for using compounds in column 2 In the following Tables 18 to 19 in place of the compound of the formula (17) used in Example 9, compounds in column 3 in the same Tables in place of 1-amino-8-hydroxynaphthalene-3,6-disulfonic acid, compounds in column 4 in the same Tables in place of 2,4-diaminobenzenesulfonic acid, compounds in column 5 in the same Tables in place of 1-aminobenzene-3-β-sulfatoethylsulfone, and compounds in column 6 in the same Tables in place of 3-carboxypyridinio.

In addition, the same compounds are obtained by changing the order of the first condensation and the second condensation with cyanuryl chloride in the above syntheses.

Furthermore, when the compounds in column 4 and column 5 of the same Tables have sulfatoethylsulfonyl group, the same results are obtained by carrying out the same syntheses except for using the corresponding hydroxyl compounds in place of the compounds in column 4 and column 5 of the same Tables (for example, when the compound in column 5 is 1-aminobenzene-3-β-sulfatoethylsulfone, using 1-aminobenzene-3-β-hydroxyethylsulfone, and when the compound in column 4 is 2-(β-sulfatoethylsulfonyl)ethyl amine, using 2-(β-hydroxyethylsulfonyl)ethyl amine), and, after the completion of the syntheses, forming sulfate ester according to the conventional method.

In addition, the same results are obtained by replacing the cyanuryl chloride with cyanuryl fluoride

TABLE 18

| Column 1 | Column 2 | Column 3 | Column 4 | Column 5 | Column 6 |
| --- | --- | --- | --- | --- | --- |
| 1 | 2-amino-4-[(4,6-dichloro-1,3,5-triazin-2-yl)amino]benzenesulfonic acid (SO₃H, NH₂, NH-triazine-Cl₂) | 8-amino-1-hydroxynaphthalene-3,6-disulfonic acid | 2,4-diaminobenzenesulfonic acid (HO₃S, H₂N, NH₂) | 4-(ethylamino)phenyl-SO₂C₂H₄OSO₃H | nicotinic acid (pyridine-3-CO₂H) |
| 2 | 2-amino-4-[(4,6-dichloro-1,3,5-triazin-2-yl)amino]benzenesulfonic acid | 8-amino-1-hydroxynaphthalene-3,6-disulfonic acid | 2,4-diaminobenzenesulfonic acid | 4-aminophenyl-SO₂C₂H₄OSO₃H | nicotinic acid |
| 3 | 2-amino-4-[(4,6-dichloro-1,3,5-triazin-2-yl)amino]benzenesulfonic acid | 8-amino-1-hydroxynaphthalene-3,6-disulfonic acid | 2,4-diaminobenzenesulfonic acid | 3-(ethylamino)phenyl-SO₂C₂H₄OSO₃H | nicotinic acid |

TABLE 18-continued
| Column 1 | Column 2 | Column 3 | Column 4 | Column 5 | Column 6 |
|---|---|---|---|---|---|
| 4 | 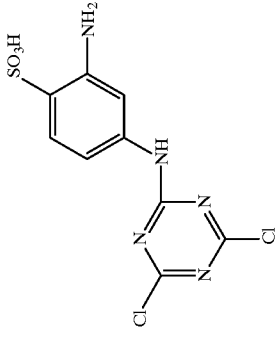 | 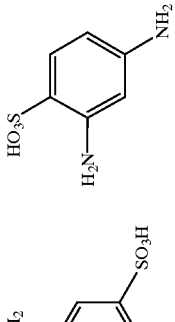 |  | $NH_2C_2H_4SO_2C_2H_4OSO_3H$ | 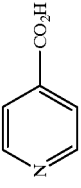 |
| 5 | 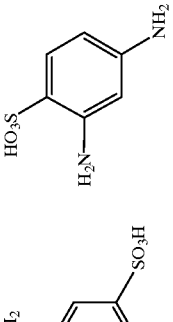 | 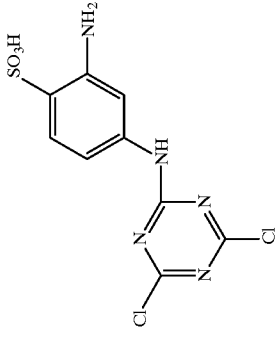 | 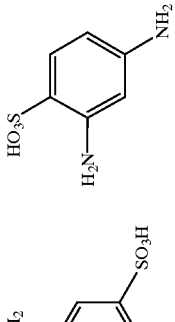 | $NH_2C_2H_4OC_2H_4SO_2CH=CH_2$ |  |

TABLE 19

| | Column 1 | Column 2 | Column 3 | Column 4 | Column 5 | Column 6 |
|---|---|---|---|---|---|---|
| 6 | | (aniline with SO₃H, NH₂, NH-pyrimidine-2,6-Cl₂) | (1-amino-8-hydroxy-naphthalene-3,6-disulfonic acid) | (2,4-diaminobenzenesulfonic acid) | (3-aminophenyl-CONHC₂H₄SO₂CH=CH₂) | (nicotinic acid / 3-pyridinecarboxylic acid) |
| 7 | | (same as row 6 col 2) | (same as row 6 col 3) | (same as row 6 col 4) | (4-amino-2-(SO₂C₂H₄OSO₃H)-anisole) | (nicotinic acid) |
| 8 | | (same as row 6 col 2) | (same as row 6 col 3) | (same as row 6 col 4) | (4-amino-5-methoxy-2-methyl-benzene with SO₂C₂H₄OSO₃H) | (nicotinic acid) |

TABLE 19-continued
| Column 1 | Column 2 | Column 3 | Column 4 | Column 5 | Column 6 |
|---|---|---|---|---|---|
| 9 | 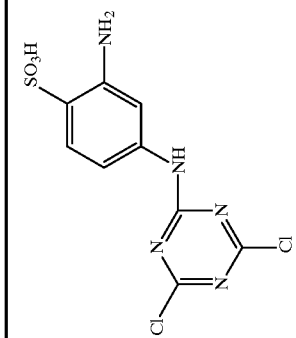 | 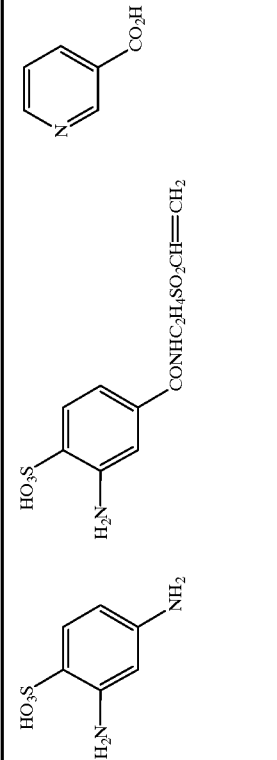 | 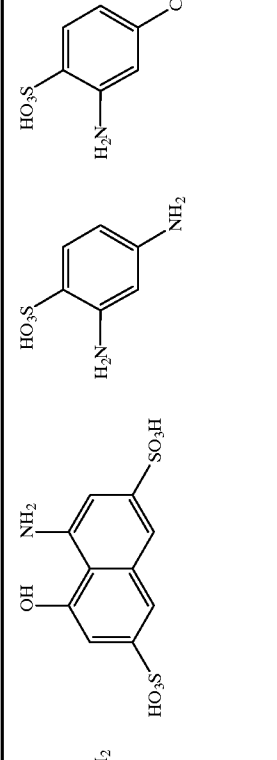 | 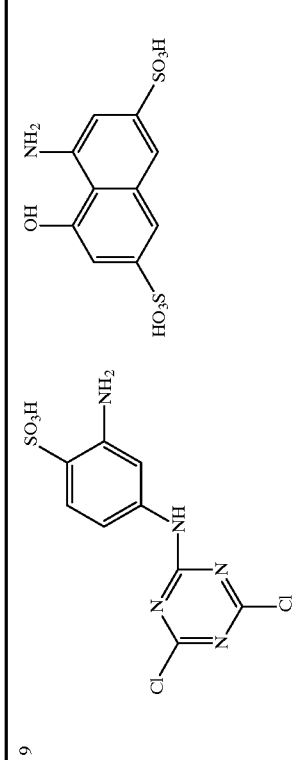 | 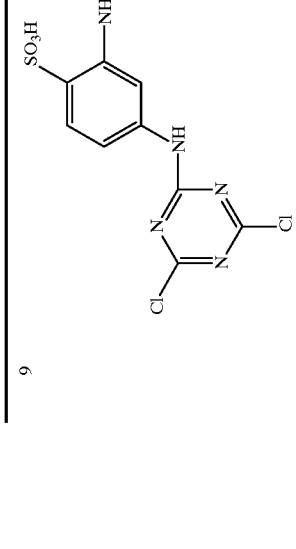 |
| 10 | 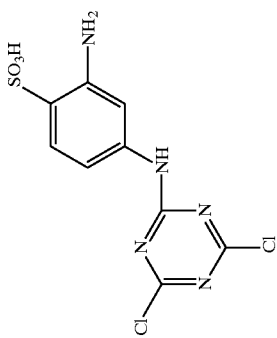 | 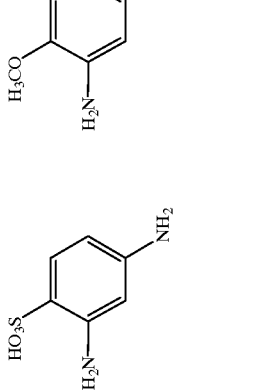 | 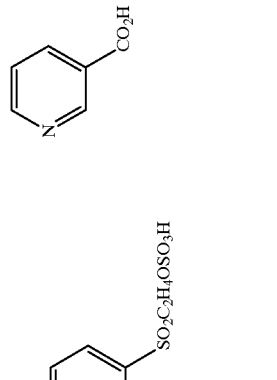 | | |

Dyeing Example 1

Into 200 parts of water were dissolved 0.3 part of the compound obtained in Example 1, and 20 parts of sodium sulfate was added to the solution. Then, 10 parts of cotton was added thereto, and the temperature was raised to 60° C. After 30 minutes from the time when the temperature reached to 60° C. 4 parts of sodium carbonate was added and dyeing was carried out for 1 hour at the same temperature. Then, washing with water and soaping were performed. Washing-off during washing with water and soaping was good and coloring of wastewater from dyeing was little. The obtained dyed products had an even deep blue color. The obtained dyed products were good in various fastness including chlorine resistance, light resistance, perspiration resistance, perspiration-sunlight resistance, acid hydrolysis resistance, alkali resistance, washing resistance and peroxide washing resistance.

Dyeing Example 2

The dyeing in Dyeing example 1 is repeated except that the amount of sodium sulfate is changed from 20 parts to 10 parts. The obtained dyed products have a comparative quality to those of the dyed products obtained in Dyeing example 1.

Dyeing Example 3

The dyeing in Dyeing example 1 is repeated except that the amount of sodium sulfate is changed from 20 parts to 4 parts. The obtained dyed products have a comparative quality to those of the dyed products obtained in Dyeing example 1.

Dyeing Example 4

The dyeing in Dyeing examples 1 to 3 are repeated except that the temperature is changed from 60° C. to 70° C. The obtained dyed products have a comparative quality to those of the dyed products obtained in Dyeing examples 1 to 3.

Dyeing Example 5

The dyeing in Dyeing examples 1 to 3 are repeated except that the temperature is changed from 60° C. to 80° C. The obtained dyed products have a comparative quality to those of the dyed products obtained In Dyeing examples 1 to 3.

Dyeing Example 6

Each of the dyeing in Dyeing examples 1 to 5 is repeated except that 0.06 part of sodium salt of a condensation product (degree of sulfonation: 110%, average degree of polymerization: 1.8) of methylnaphthalenesulfonic acid and formaldehyde is used in addition to 0.3 parts of the bisazo compound. The obtained dyed products have a comparative quality to those of the dyed products obtained in Dyeing examples 1 to 5.

Dyeing Example 7

Color pastes having the following compositions are prepared using respective compounds obtained in Examples 1 to 10.

| Composition of color paste: | |
|---|---|
| Bisazo compound | 5 parts |
| Urea | 5 parts |
| Sodium alginate (5%) stock paste | 50 parts |
| Hot water | 25 parts |
| Sodium bicarbonate | 2 parts |
| Balance (water) | 13 parts |
| Total | 100 parts |

The color pastes are printed onto a cotton broad cloth treated for mercerization. The printed cloth is intermediately dried, steamed at 100° C. for 5 minutes, washed with hot water, soaped, washed again with hot water and finished by drying. The obtained dyed products respectively have an even deep blue color and are good in various fastness including chlorine resistance, light resistance, perspiration resistance, perspiration-sunlight resistance, acid hydrolysis resistance, alkali resistance, washing resistance and peroxide washing resistance.

Dyeing Example 8

The dyeing in Dyeing examples 1 to 7 are repeated except for using a compound obtained in one of Examples 2 to 10 in place of the bisazo compound obtained in Example 1. The obtained dyed products have a comparative quality to those of the dyed products obtained in Dyeing examples 1 to 7.

What we claim is:

1. A bisazo compound represented by the following general formula (1);

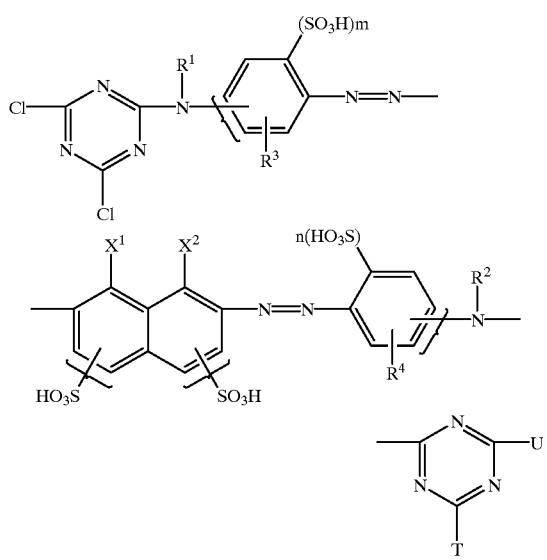

wherein one of $X^1$ and $X^2$ is hydroxyl and the other is amino, $R^1$ and $R^2$, which are the same to or different from each other, represent hydrogen or alkyl which may be optionally substituted, $R^3$ and $R^4$, which are the same to or different from each other, represent hydrogen, sulfo, methyl, methoxy or chloro, m and n, which are the same to or different from each other, represent 0 or 1, U represents a group selected from the groups represented by the following formulae (2a), (2b) or (2c):

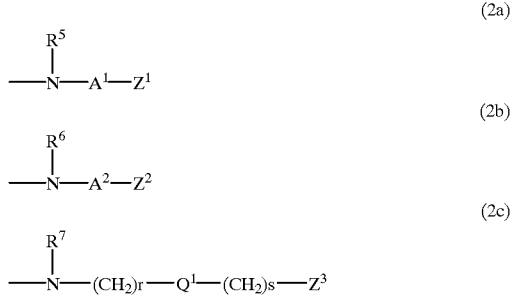

wherein $R^5$ represents hydrogen or alkyl which may be optionally substituted, $R^6$ and $R^7$ represent hydrogen, alkyl which may be optionally substituted or phenyl which may be optionally substituted, $A^1$ represents phenylene which may be optionally substituted or naphthylene which may be optionally substituted, $A^2$ represents alkylene which may be optionally substituted, $Q^1$ represents —O—, —S— or —$NR^8$— wherein $R^8$ represents hydrogen, alkyl which may be optionally substituted or phenyl which may be optionally substituted, r and s, which are the same to or different from each other, represent 2, 3 or 4, $Z^1$, $Z^2$ and $Z^3$ represent a fiber-reactive group selected from the groups represented by the following formulae (3a) or (3b):

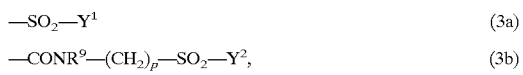

wherein $Y^1$ and $Y^2$, which are the same to or different from each other, represent —CH=$CH_2$ or —$CH_2CH_2L$ wherein L is a group which may be eliminated by the action of an alkali, $R^9$ represents hydrogen or alkyl which may be optionally substituted, and p is an integer of 1 to 6, T represents a group selected from the groups represented by the formulae (2a), (2b) or (2c), fluoro, chloro, pyridinio which may be optionally substituted or a group selected from the groups represented by the following formulae (4a), (4b) or (4c);

wherein $R^{10}$ and $R^{11}$, which are the same to or different from each other, represent hydrogen, alkyl which may be optionally substituted, cycloalkyl which may be optionally substituted or phenyl which may be optionally substituted, $R^{12}$ represent hydrogen, alkyl which may be optionally substituted, cycloalkyl which may be optionally substituted or phenyl which may be optionally substituted, $Q^3$ represents —$CH_2$—, —O—, —S—, —$SO_2$— or —$NR^{13}$— wherein $R^{13}$ represents hydrogen or alkyl which may be optionally substituted, and q is 1, 2 or 3, or a salt thereof.

2. The bisazo compound or a salt thereof according to claim 1, wherein $R^1$ and $R^2$ in the formula (I) are hydrogen.

3. The bisazo compound or a salt thereof according to claim 1, wherein $R^3$ and $R^4$ in the formula (I) are hydrogen or sulfo.

4. The bisazo compound or a salt thereof according to claim 1, wherein T in the formula (I) is fluoro, chloro, pyridinio which may be optionally substituted or a group represented by the formula (4a).

5. The bisazo compound or a salt thereof according to claim 4, wherein T in the formula (I) is pyridinio which may be optionally substituted.

6. The bisazo compound or a salt thereof according to claim 4, wherein T in the formula (I) is fluoro or chloro.

7. The bisazo compound or a salt thereof according to claim 1, wherein U in the formula (I) is a group represented by the formulae (2a) or (2b).

8. The bisazo compound or a salt thereof according to claim 7, wherein $Z^1$ in the formula (2a) and $Z^2$ in the formula (I) are the group represented by the formula (3a).

9. The bisazo compound or a salt thereof according to claim 1 which is represented by the following general formula (1a):

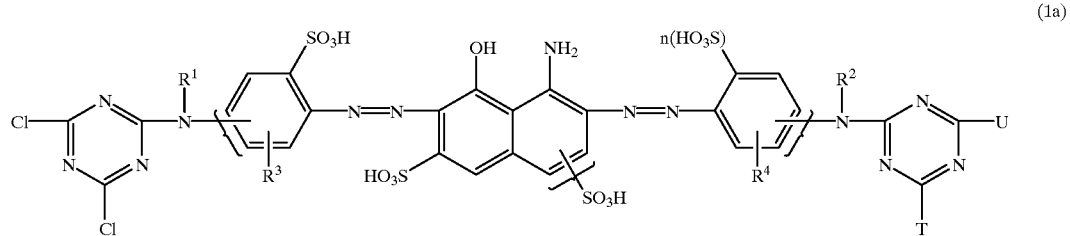

wherein $R^1$, $R^2$, $R^3$, $R^4$, U, T and n have the same meaning as those in claim 1.

10. A process for dyeing or printing a fiber material comprising applying thereto the bisazo compound or a salt thereof according to claim 1.

* * * * *